US008931175B2

(12) United States Patent
Mori et al.

(10) Patent No.: US 8,931,175 B2
(45) Date of Patent: Jan. 13, 2015

(54) FLUID DYNAMIC BEARING DEVICE

(75) Inventors: Natsuhiko Mori, Kuwana (JP);
Nobuyoshi Yamashita, Kuwana (JP);
Fuminori Satoji, Kuwana (JP); Isao Komori, Kuwana (JP); Toshiyuki Mizutani, Kuwana (JP); Masafumi Okuma, Tokyo (JP); Kenichi Mitani, Tokyo (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/435,915

(22) Filed: Mar. 30, 2012

(65) Prior Publication Data
US 2012/0186983 A1 Jul. 26, 2012

Related U.S. Application Data

(62) Division of application No. 11/795,410, filed as application No. PCT/JP2006/309640 on May 15, 2006, now abandoned.

(30) Foreign Application Priority Data

May 18, 2005 (JP) ................................ 2005-145362
May 18, 2005 (JP) ................................ 2005-145370
May 18, 2005 (JP) ................................ 2005-145373
May 18, 2005 (JP) ................................ 2005-145506
May 18, 2005 (JP) ................................ 2005-145517
May 18, 2005 (JP) ................................ 2005-145521

(51) Int. Cl.
*F16C 32/06* (2006.01)
*F16C 33/10* (2006.01)
(Continued)

(52) U.S. Cl.
CPC ............. *F16C 33/107* (2013.01); *F16C 17/026* (2013.01); *F16C 17/107* (2013.01); *F16C 2370/12* (2013.01)
USPC ...................... 29/898.12; 29/603.03; 384/107; 384/120; 384/123; 360/99.08

(58) Field of Classification Search
USPC .................... 29/596, 603.03, 898.12, 898.02, 29/898.04, 898.049, 898.054, 898.055, 29/898.058; 384/100, 107, 114, 115, 120, 384/121, 123; 360/99.07, 99.08
See application file for complete search history.

(56) References Cited

U.S. PATENT DOCUMENTS 5,203,194 A * 4/1993 Marquardt ...................... 72/316
5,678,929 A * 10/1997 Parsoneault et al. .......... 384/112
(Continued)

FOREIGN PATENT DOCUMENTS

CN          1488043 A       4/2004
JP          61-112818 A     5/1986
(Continued)

OTHER PUBLICATIONS

"Specification" section of Japanese Patent No. 2003-056569A.*
(Continued)

*Primary Examiner* — David Bryant
*Assistant Examiner* — Jun Yoo
(74) *Attorney, Agent, or Firm* — Westerman, Hattori, Daniels & Adrian, LLP

(57) ABSTRACT

It is an object of the present invention to provide a bearing member having a highly accurate dynamic pressure generating portion stably at low cost. Dynamic pressure grooves (8a1) and (8a2) are formed as the dynamic pressure generating portions on an inner circumferential surface of the electroforming portion (10) by an electroforming process, and injection molding is performed by using a resin while inserting the electroforming portion (10), thereby forming a bearing member (8). A shaft member (2) is inserted into an inner circumference of the bearing member.

10 Claims, 23 Drawing Sheets

(51) Int. Cl.
*F16C 17/02* (2006.01)
*F16C 17/10* (2006.01)

(56) References Cited

U.S. PATENT DOCUMENTS

| 6,427,330 B1 | 8/2002 | Kobayashi et al. |
| 6,532,662 B2 * | 3/2003 | Kobayashi et al. ........ 29/898.02 |
| 6,619,847 B1 | 9/2003 | Ishikawa et al. |
| 2002/0064324 A1 | 5/2002 | Yamada |
| 2004/0042695 A1 | 3/2004 | Shishido et al. |
| 2004/0057780 A1 | 3/2004 | Farbaniec et al. |
| 2004/0258335 A1 | 12/2004 | Shimizu et al. |
| 2008/0212908 A1 | 9/2008 | Mori et al. |

FOREIGN PATENT DOCUMENTS

| JP | 10-306822 A | 11/1998 |
| JP | 2000-120695 A | 4/2000 |
| JP | 2001-115278 A | 4/2001 |
| JP | 2001-182740 A | 7/2001 |
| JP | 2002-005172 A | 1/2002 |
| JP | 2002-168240 A | 6/2002 |
| JP | 2002-538392 A | 11/2002 |
| JP | 2003-056552 A | 2/2003 |
| JP | 2003-056569 A | 2/2003 |
| JP | 2004-132403 A | 4/2004 |
| JP | 2004-166439 A | 6/2004 |
| JP | 2005-114164 A | 4/2005 |
| JP | 2006-322500 A | 11/2006 |
| JP | 2006-322508 A | 11/2006 |
| JP | 2006-322511 A | 11/2006 |
| WO | 00-52348 A1 | 9/2000 |

OTHER PUBLICATIONS

Chinese Office Action dated Oct. 16, 2009, issued in corresponding Chinese Patent Application No. 200680017287.2 (With English Translation).
Japanese Office Action dated Jan. 28, 2011, issued in corresponding Japanese Patent Application No. 2005-145517.
Japanese Office Action dated Jan. 28, 2011, issued in corresponding Japanese Patent Application No. 2005-145370.
International Preliminary Report on Patentability form (PCT/IB1373) of International Application No. PCT/JP2006/309640 issued on Nov. 19, 2007 with form PCT/ISA/237.
International Search Report of PCT/JP2006/309640, date of mailing Sep. 5, 2006.
Japanese Office Action dated Jun. 30, 2011, issued in corresponding Japanese Patent Application No. 2005-145373.
Notification of Interrogation dated Dec. 21, 2011, issued in corresponding Japanese Patent Application No. 2005-145370.
Japanese Office Action dated Sep. 24, 2012, issued in corresponding Japanese Patent Application No. 2011-21158, (23 pages).

* cited by examiner

FIG. 4
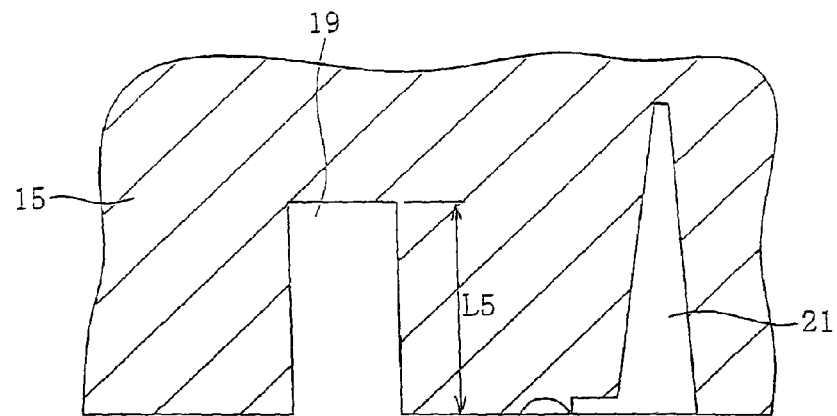
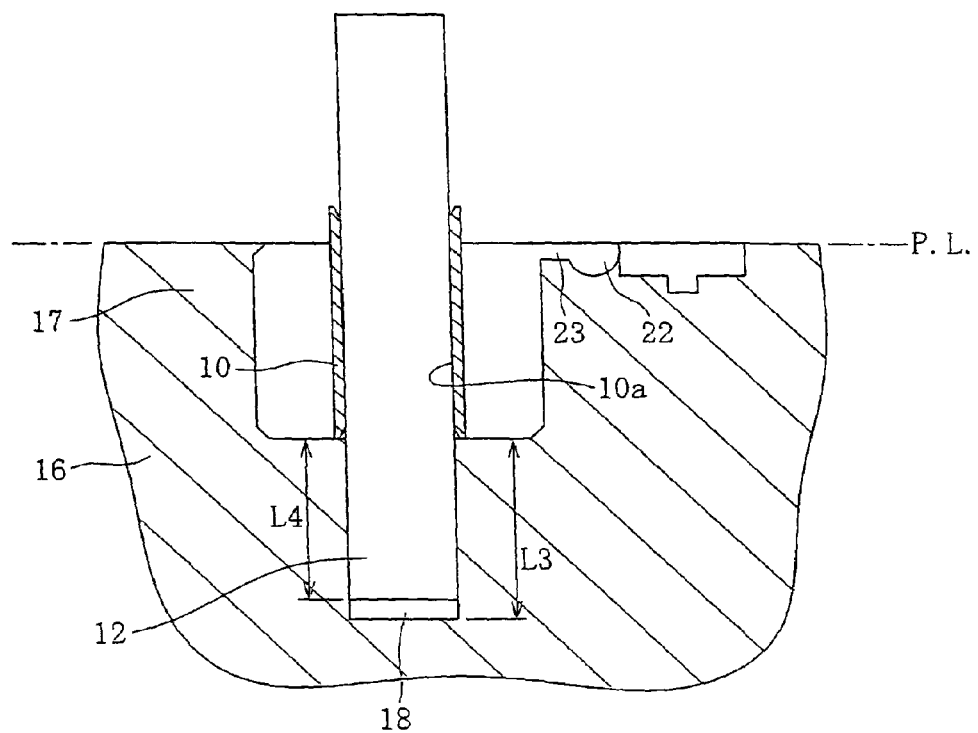

FLUID DYNAMIC BEARING DEVICE

CROSS-REFERENCE TO RELATED CASES

The present application is a divisional of U.S. application Ser. No. 11/795,410 filed Jul. 17, 2007, which is a U.S. National Stage application of International Application No. PCT/JP2006/309640 filed May 15, 2006, and which is based on and claims priority from Japanese application No. 2005-145517 filed May 18, 2005, Japanese application No. 2005-145521 filed May 18, 2005, Japanese application No. 2005-145370 filed May 18, 2005, Japanese application No. 2005-145373 filed May 18, 2005, Japanese application No. 2005-145362 filed May 18, 2005, and Japanese application No. 2005-145506 filed May 18, 2005, the entirety of which is incorporated herein by reference.

BACKGROUND OF THE INVENTION

1. Field of the Invention

The present invention relates to a bearing device for rotatably supporting a shaft member by a dynamic pressure action of fluid, which is generated in a bearing gap. This type of the bearing device is called a "fluid dynamic bearing device", and is suitable for use in a spindle motor mounted in an information apparatus, for example, a magnetic disk device such as an HDD and an FDD, an optical disk device such as a CD-ROM/RAM, or a magneto-optical disk device such as an MD/MO, in a polygon scanner motor mounted in a laser beam printer (LBP) or the like, or in a small motor mounted in an electrical apparatus such as an axial fan.

2. Description of the Related Art

In the fluid dynamic bearing device, usually, a shaft member is supported in a non-contact fashion with a bearing member in a radial direction by a dynamic pressure action of fluid, which is generated in a radial bearing gap. In order to generate the dynamic pressure action of the fluid in the radial bearing gap, dynamic pressure grooves arranged, for example, in a herringbone configuration are formed as a dynamic pressure generating portion in a predetermined region of at least any one of an outer circumferential surface of the shaft member and an inner circumferential surface of the bearing member, which is opposite thereto.

Meanwhile, for the above-mentioned fluid dynamic bearing device for the information apparatus, extremely high rotational accuracy is required, and hence, it is necessary to form the dynamic pressure grooves with extremely high accuracy. As a method of forming this type of the dynamic pressure grooves on the inner circumferential surface of the bearing member, a form rolling is known (for example, see JP 10-196640 A).

In the invention described in JP 10-196640 A described above, a rolling machine having a plurality of protrusions is inserted into the inner circumference of the bearing member, and the rolling machine is then allowed to travel therein in an axial direction while being rotated alternately in a clockwise direction and a counter clockwise direction, thereby forming the dynamic pressure grooves in the inner circumference of the bearing member. In the method of forming the dynamic pressure grooves by the form rolling as described above, variation is prone to occur in a shape of the grooves owing to characteristics of the method, and it is difficult to mass-produce highly accurate grooves stably at low cost.

Further, for the above-mentioned bearing device for use in the information apparatus, much higher rotational accuracy is required. Therefore, it becomes important to set, with high accuracy, a gap (clearance) between the inner circumferential surface of the bearing member and the outer circumferential surface of the shaft member, which is opposite thereto.

SUMMARY OF THE INVENTION

In this connection, it is an object of the present invention to provide a fluid dynamic bearing device having high rotational accuracy.

To achieve the above-mentioned object, a fluid dynamic bearing device according to the present invention includes: a bearing member; and a shaft member inserted into an inner circumference of the bearing member, and is characterized in that the bearing member is formed by injection molding in which an electroforming portion is inserted, and any one of an inner circumferential surface of the electroforming portion and an outer circumferential surface of the shaft member, which is opposed to the inner circumferential surface of the electroforming portion is provided with a dynamic pressure generating portion formed thereon.

The electroforming portion is formed by an electroforming process of forming a metal layer by causing metal ions to deposit on a master surface. Such the formation of the metal layer can also be performed by using a method similar to electroless plating, as well as a method similar to electrolytic plating. In a case of forming the dynamic pressure generating portion on the electroforming portion, a forming portion is formed into a non-perfect circular shape in cross section, which corresponds to a shape of the dynamic pressure generating portion, and in a case of forming the dynamic pressure generating portion on the shaft portion, the forming portion is formed into a perfect circular shape in cross section. Owing to characteristics of the electroforming process, the forming portion of a master shaft is transferred to the electroforming portion with high accuracy, and a surface to which the forming portion is transferred has a surface accuracy following to a surface accuracy of the master shaft. Accordingly, if the surface accuracy of the master shaft (in particular, of the forming portion thereof) is enhanced in advance, the inner circumferential surface of the bearing member can be molded with high accuracy, thus making it possible to set the bearing gap with high accuracy.

For example, the accuracy of the forming portion of the master shaft is enhanced in advance by forming the dynamic pressure generating portion on the inner circumferential surface of the electroforming portion, thus making it possible to form the dynamic pressure generating portion with high accuracy. The bearing member may be fabricated through the steps of: fabricating a master shaft having a forming portion corresponding to a shape of a dynamic pressure generating portion on an outer circumference of the master shaft (master shaft fabrication step); forming an electroforming portion on the outer circumference of the master shaft including the forming portion (electroforming step); performing injection molding while inserting the electroforming portion after the electroforming portion is formed (molding step); and separating the master shaft and the electroforming portion from each other after the injection molding (separation step).

In the separation step after the above-mentioned injection molding, the master shaft and the electroforming portion are separated from each other. Such the separation can be performed, for example, by allowing an inner stress in a radial expansion direction, which is accumulated in the electroforming portion as the electroforming process is performed, to be released to make the inner circumference of the electroforming portion be thus expanded in diameter. When a diameter expansion amount of the electroforming portion is insufficient only by an operation described above, the master shaft and the electroforming portion are heated or cooled to give a difference in thermal expansion amount therebetween. Then, it becomes possible to smoothly draw out the master shaft from the inner circumference of the bearing member without damaging the dynamic pressure generating portion formed on the electroforming portion.

As the shaft member of the bearing device, the master shaft used at the time of molding the electroforming portion may be directly used, and a separate member from the master shaft may be used as well. In the latter case, the separated master shaft can be repeatedly used in the electroforming process. Accordingly, a highly accurate bearing member can be mass-produced stably.

As an example of the dynamic pressure generating portion, a plurality of dynamic pressure grooves arranged in a herringbone configuration and the like can be exemplified. A dynamic pressure groove pattern including the dynamic pressure grooves forms an extremely complicated shape. Even in this case, if a forming portion having a portion corresponding to the dynamic pressure groove pattern is formed in advance on the outer circumference of the master shaft in the master shaft fabrication step, the shape of the forming portion is precisely transferred by the electroforming process. Accordingly, the highly accurate dynamic pressure groove pattern can be formed easily at low cost. Note that the dynamic pressure generating portion formed on the electroforming portion may be formed, for example, of a plurality of circular arc surfaces as well as the above-mentioned dynamic pressure grooves.

In the molding step, the injection molding is performed while inserting the master shaft which has undergone the electroforming process into a mold (insert molding), thereby integrally molding the bearing member composed of the mold portion and the electroforming portion. In the insert molding, a highly accurate part is integrally molded only by enhancing accuracy of the mold and positioning the electroforming portion with high accuracy. Accordingly, if the electroforming portion and the master shaft are thereafter separated from each other, a resultant molded article can be directly used as the bearing member for the bearing device. Owing to the characteristics of the electroforming process, the outer circumferential surface of the electroforming portion is formed to have a rough surface. Accordingly, when the insert molding is performed as described above, the injection molding material enters the outer circumferential surface of the electroforming portion, so an adhesion force therebetween becomes stronger due to an anchor effect.

It is preferable to form a flange on the electroforming portion prior to the molding step. By forming the flange, the flange and the mold portion are prevented from being detached from each other or being rotated with respect to each other after the injection molding. Accordingly, much higher adhesion force can be obtained between the electroforming portion and the mold portion. In particular, by forming the outer circumferential surface of the flange into the non-perfect circular shape, it becomes possible to obtain a higher effect to prevent the rotation as described above. The flange also includes the one which extends in an oblique direction from the axis center (refer to FIG. 7), as well as the one which extends in a perpendicular direction to the axis center (refer to FIG. 6).

The flange of the electroforming portion can be formed by plastically deforming the electroforming portion. For example, if an end surface of the electroforming portion, which is brought into intimate contact with the outer circumference of the master shaft, is pressurized in the axial direction, the end portion of the electroforming portion is plastically deformed to the radial outer side thereof since a portion to be pressurized cannot be deformed to the inner diameter side thereof which is brought into intimate contact with the master shaft. Thus, it becomes possible to easily form the outward flange. In particular, in the case of molding the electroforming portion by the injection molding, if the electroforming portion is partially deformed plastically by clamping of the metal mold, after the flange is formed, the resin or the metal is injected into a cavity while leaving the electroforming portion in which the flange is formed as it is, thus making it possible to form the bearing by the insert molding. Thus, it becomes possible to fabricate the bearing at low cost without requiring a special process for forming the flange. Note that, since the outer circumferential surface of the plastically deformed flange usually becomes a non-perfect circular shape, it becomes possible to form the flange having the outer circumferential surface with the non-perfect circular shape without particularly adding another step.

If the flange formed by the plastic deformation is formed on one end portion of the electroforming portion or both end portions thereof, an influence of the plastic deformation becomes less for the axial center portion of the bearing surface. Hence, a bearing surface accuracy on the axial center portion of the bearing surface, which is important in terms of a function of the bearing, can be prevented from being decreased.

By the way, if a pressurizing force applied to the electroforming portion is too large in the case of forming the flange by the plastic deformation, there is an apprehension that, owing to an impact at that time, the inner circumferential surface of the electroforming portion, which is brought into intimate contact with the master shaft, may be peeled off from the outer circumferential surface of the master shaft. In order to prevent such the situation, it is desirable to set a change of an axial length of the electroforming portion between before and after the plastic deformation within 50% of an axial length of the electroforming portion after the plastic deformation. To be specific, when an axial length of the electroforming portion before the plastic deformation of the flange is L2, and the axial length of the electroforming portion after the plastic deformation is L1, it is desirable to set L1 and L2 so as to satisfy the following expression:

$$0 < A/L1 \leq 0.5 \text{ (where } A=L2-L1)$$

As a material subjected to the injection molding in the molding step, a metal material, ceramics, and the like are usable as well as the resin material. In the case of using the metal material, it is possible to use, for example, injection molding of low melting point metal such as a magnesium alloy, so-called MIM molding for performing the injection molding for metal powder and a binder with each other, followed by degreasing and sintering, and the like. In the case of using the ceramics, it is possible to use, for example, so-called CIM molding for performing the injection molding for ceramic powder and the binder with each other, followed by degreasing and sintering. In general, in the case of using the resin material, features are obtained that an obtained article is excellent in moldability and lightweight. In the case of using the metal material, features are obtained that an obtained article is excellent in rigidity, conductivity, and heat resistance. Further, in the case of using the ceramics, features are obtained that an obtained article is more lightweight than the metal material and excellent in rigidity, heat resistance, and so on.

By the way, when the electroforming portion is formed into a cylindrical shape, it is conceived that a residual stress in a diameter expansion direction is applied to an inner composition of the electroforming portion after being formed. Meanwhile, in the case of using the resin as the injection molding material, the cylindrical resin mold portion is going to be shrunk as being solidified. Hence, after the resin molding of the electroforming portion, the outer circumferential surface of the electroforming portion and the inner circumferential surface of the resin mold portion are pressed against each other. In addition, while the inner circumferential surface of the electroforming portion becomes a smooth surface corresponding to the outer circumferential surface of the master shaft, the outer circumferential surface of the electroforming portion becomes a rough surface in general. Accordingly, the resin enters irregularities of the surface of the electroforming portion after the resin molding, and an anchor effect is generated. Owing to composite action of the above, the strong adhesion force between the electroforming portion and the resin mold portion can be obtained.

In order to put the electroforming bearing as described above into practical use as an industrial product, it becomes necessary to stably ensure much stronger adhesion force between the electroforming portion and the mold portion. Meanwhile, even if the strong adhesion force is obtained, if other bearing characteristics such as the bearing surface accuracy are traded off therefor, the electroforming bearing is inhibited from being put into practical use.

In this connection, in the present invention, the resin is used as the injection molding material of the bearing member, and a molding shrinkage of the resin is set within a range of 0.02% to 2.0% inclusive. By setting the molding shrinkage of the resin at 0.02% or more, a shrinkage force caused in the resin mold portion at the time when the molten resin is solidified increases. Accordingly, a required adhesion force can be surely ensured between the electroforming portion and the mold portion. Meanwhile, when the molding shrinkage of the resin is too large, the shrinkage force of the mold portion becomes excessive, resulting in an apprehension that the electroforming portion may be deformed owing to propagation of the shrinkage force. However, an upper limit of the molding shrinkage is set at 2.0%, thus making it possible to avoid this type of harmful effect.

According to the present invention, it is desirable that the dynamic pressure generating portion has a cross section in a radius direction, in which a radius $r1$ of a virtual circle inscribed to the inner circumferential surface of the electroforming portion is larger than a radius $r2$ of a virtual circle circumscribed to the outer circumferential surface of the shaft member, and in which a sum of a circularity of the bearing surface of the electroforming portion and a circularity of the outer circumferential surface of the shaft member is 4 μm or less.

As described above, the radius $r1$ of the inscribed circle of the bearing surface of the electroforming portion and the radius $r2$ of the circumscribed surface of the shaft member are set to $r1>r2$, and the minimum clearance between the bearing surface of the bearing member and the outer circumferential surface of the shaft member can be thus ensured, thereby making it possible to avoid contact and sliding between the shaft member and the bearing member when they rotate relatively to each other as much as possible to obtain a stable rotation supporting state. Meanwhile, even when the above-mentioned minimum clearance is ensured, if circularities of the bearing surface of the bearing member and the outer circumferential surface of the shaft member are too high, the bearing gap is uneven in the circumferential direction. Accordingly, rotational accuracy including accuracy such as radial run out of the shaft decreases, and there is also a fear of a lifetime of the bearing decreasing owing to abrasion of both of the surfaces on such the contact and sliding portion. According to verification by the inventor of the present invention from such a viewpoint, it has been found out that the above-mentioned harmful effect can be avoided when the sum of the circularity of the bearing surface of the electroforming portion and the circularity of the outer circumferential surface of the shaft member is 4 μm or less.

In this case, a master used at the time of the electroforming process can be directly used as the shaft member. The surface shape of the master is transferred precisely in a micron order to the inner circumferential surface of the electroforming portion, which serves as the bearing surface. Accordingly, when the sum of the circularity of the bearing surface of the electroforming portion and the circularity of the outer circumferential surface of the shaft member is defined as described above, the circularity of the outer circumferential surface of the shaft member as the master becomes approximately a half (2 μm) of the above-mentioned sum. Hence, if the master surface is subjected in advance to a finishing process so that the circularity is the above-mentioned numeric value or less, it becomes possible to stably obtain good rotational accuracy and a long lifetime of the bearing.

As the shaft member, a member fabricated separately from the master may also be used as well as the master. Also in this case, if a surface of the member is finished so that the circularity thereof is the above-mentioned numeric value or less, which is half of the above-mentioned sum, good rotational accuracy can be obtained stably.

Note that, the radii $r1$ and $r2$ and the circularities are measured on common cross sections in the radius direction. It is necessary that the cross sections in the radius direction be taken at a few arbitrary spots (desirably, three or more spots at an equal interval) in the axial direction, and that the above-mentioned conditions be satisfied at the respective positions thus extracted. Note that the "circularity" mentioned here means a difference between radii of two concentric geometric circles in the case where an interval of the two concentric circles becomes the minimum when a circular body is sandwiched by the two concentric geometric circles (refer to FIG. 36).

On the electroforming portion, a thrust bearing surface for supporting the end portion of the shaft member in the thrust direction can be formed. In this case, it is not necessary to incorporate a member (thrust plate and the like) constructing the thrust bearing surface into the main body by means such as press-fitting and adhesion. Accordingly, the number of steps and the number of parts are reduced, thus making it possible to achieve cost reduction of the bearing device.

As the thrust bearing portion, a dynamic bearing for supporting the shaft member in a non-contact fashion in the thrust direction by a dynamic pressure action of fluid, which is generated in a thrust bearing gap between the thrust bearing surface and an end surface of the shaft member, the end surface being opposite thereto, can also be used as well as a pivot bearing for supporting the shaft member in a contact fashion in the thrust direction on the thrust bearing surface. The dynamic bearing can be constructed, for example, by forming a plurality of dynamic pressure grooves on any one of the thrust bearing surface and the end surface of the shaft member, which is opposite thereto.

In the case where the thrust bearing portion is formed of the dynamic bearing, and where the dynamic pressure grooves are formed on the thrust bearing surface, if a thrust bearing surface forming portion having an irregular shape corresponding to a shape of the dynamic pressure grooves is formed in advance on the shaft end of the master shaft, the dynamic pressure grooves of the thrust bearing surface can be formed by the electroforming process with high accuracy. On the other hand, in the case where the dynamic pressure grooves are formed on the end surface of the shaft member, the electroforming process is performed by a master shaft in which the shaft end is formed into a flat surface, and the thrust bearing surface is formed into a flat surface shape which does not have the dynamic pressure generating portion. Then, after the electroforming portion and the master shaft are separated from each other, a shaft member in which the dynamic pressure grooves are formed in advance on the end surface in another step is inserted into the inner circumference of the shaft member, and the dynamic bearing is thus constructed.

In the case of using the master shaft as the shaft member, another thrust bearing surface may also be formed on the other end of the master shaft, as well as the forming portion for forming the thrust bearing surface is formed on one end of the master shaft. In this case, if the thrust bearing surface is formed by the forming portion, and after the master shaft and the electroforming portion are separated from each other, the master shaft is reversed and inserted into the inner circumference of the bearing member, the thrust bearing portion can be constructed between the bearing constructing portion of the master shaft and the thrust bearing surface of the electroforming portion. For the bearing constructing portion of the master shaft, for example, there is considered a construction in which the plurality of dynamic pressure grooves are formed on the end surface, a construction in which the end surface is formed into the flat surface, or a construction in which the shaft end is formed into a spherical shape. In the case of the former two constructions, the dynamic bearing is composed of the bearing constructing portion of the master shaft and the thrust bearing surface, and in the case of the latter one construction, the pivot bearing is composed of the bearing constructing portion and the thrust bearing surface.

The bearing device having the above-mentioned construction can be preferably used for a motor, for example, a spindle motor for the disk device such as the HDD. This motor is characterized by being inexpensive, and in addition, in that rotational accuracy and durability are high.

The above description shows the case where the dynamic pressure generating portion is formed on any one of the inner circumferential surface of the electroforming portion and the outer circumferential surface of the shaft member, which is opposite thereto. However, the respective constructions described above can also be applied similarly to the case (perfect circular bearing) where any of the inner circumferential surface of the electroforming portion and the outer circumferential surface of the shaft member, which is opposite thereto, has a perfect circular shape in cross section, which does not have the dynamic pressure generating portion. In this case, the master shaft is formed into the perfect circular shape in cross section. Thus, the radial bearing surface (inner circumferential surface of the electroforming portion) of the bearing member is formed into the perfect circular shape. Accordingly, the shaft member with the perfect circular shape is inserted into the inner circumference of the bearing member after the master shaft and the electroforming portion are separated from each other, and a radial bearing gap with the perfect circular shape is thus formed between the radial bearing surface with the perfect circular shape and the outer circumferential surface of the shaft member with the perfect circular shape in cross section, which is opposite thereto.

According to the present invention, the following effects can be obtained.

(1) It is possible to set the bearing gap at high accuracy, and thus the bearing performance of the bearing device can be enhanced.

(2) A bearing member having a highly accurate dynamic pressure generating portion can be provided stably at low cost. In addition, powder that may be generated by cutting is not generated when the dynamic pressure grooves are formed, and an occurrence of contamination can be avoided.

(3) Through the flange portion, the electroforming portion and the mold portion are prevented from being detached from each other or rotated with respect to each other, and accordingly, the adhesion force between the electroforming portion and the mold portion can be further enhanced.

(4) The bearing device can exert bearing performance which is stable for a long period of time, and the number of parts and the number of assembly man-hours can be reduced, thus making it possible to achieve cost reduction.

(5) Strong adhesion force can be stably obtained between the electroforming portion and the mold portion. Meanwhile, deformation of the electroforming portion owing to the shrinkage of the mold can be restricted, thus making it possible to obtain higher bearing performance.

(6) Rigidity, heat resistance, conductivity, and the like of the bearing can be enhanced. Accordingly, the electroforming bearing becomes usable even under a severe environment with a high load, a high temperature, and the like, thus making it possible to contribute to expansion of the purpose of the electroforming bearing.

BRIEF DESCRIPTION OF THE DRAWINGS

In the accompanying drawings:

FIG. 4 is a cross-sectional view of an injection molding metal mold;

DESCRIPTION OF THE PREFERRED
EMBODIMENTS

A description will be made of embodiments of the present invention based on the drawings.

Figure 1:
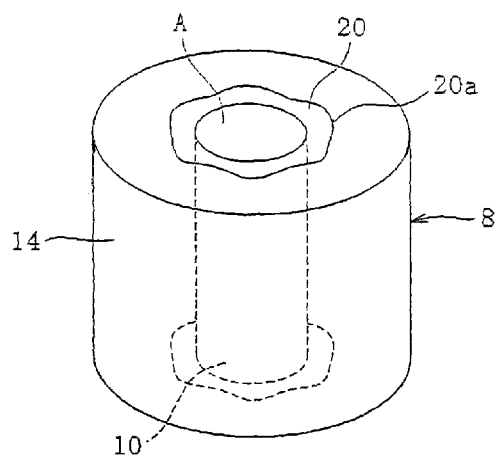
FIG. 1 is a perspective view showing a bearing member according to the present invention.

A bearing member 8 having a construction of the present invention, which is shown in FIG. 1, is fabricated through the steps of: fabricating a master shaft (refer to FIG. 2A); masking a spot of the master shaft 12, which requires the masking (refer to FIG. 2B); forming an electroforming shaft 11 by performing an electroforming process for an unmasked portion of the master shaft 12 (refer to FIG. 2C); forming the bearing member 8 by molding an electroforming portion 10 of the electroforming shaft 11 with a resin and the like (refer to FIG. 5); and separating the electroforming portion 10 and the master shaft 12 from each other.

Figure 2A:
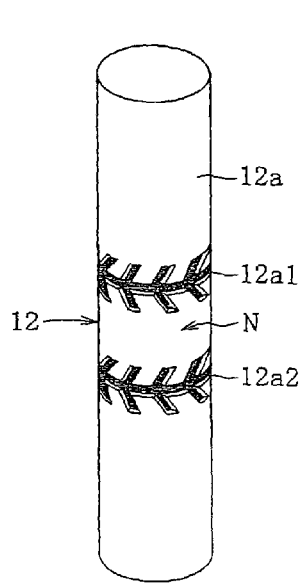
FIG. 2A is a perspective view of a master shaft.

The master shaft 12 shown in FIG. 2A is formed of a conductive metal material, for example, stainless steel subjected to a quenching treatment. As a matter of course, as long as moldability of the electroforming portion 10 is good, metal materials other than the stainless steel, for example, a nickel alloy, a chromium alloy, and the like can also be used. Even a nonmetal material such as ceramics can be used as the master shaft by being subjected to a conducting treatment (for example, by forming a conductive metal coating film on a surface thereof). It is desirable that a surface of the master shaft 12 be subjected in advance to a surface treatment for reducing a frictional force between the electroforming portion 10 and itself, for example, to fluorine resin coating. In addition to a solid shaft, the master shaft 12 can also be formed of a hollow shaft or a solid shaft formed by filling a hollow portion with a resin.

As show in FIG. 2A, on a region of an outer circumferential surface 12a of the master shaft 12, which becomes a portion where the electroforming portion 10 is to be formed, a forming portion N having an irregular shape corresponding to a shape of radial bearing surfaces A described later is formed. Aspects of irregularities of the forming portion N and the radial bearing surfaces A are completely opposite to each other, and protruding portions of the radial bearing surfaces correspond to recessed portions 12a1 and 12a2 of the forming portion N. The example shown in the figure illustrates the case where the recessed portions 12a1 and 12a2 are formed into a configuration corresponding to a dynamic pressure groove pattern of a herringbone shape; however, the recessed portions 12a1 and 12a2 can also be formed into a configuration corresponding to a dynamic pressure groove pattern of a spiral shape.

The forming portion N is formed, for example, by using a surface treatment process such as etching as well as a cutting process and a machining process such as a pressing process. Accuracy of the outer circumferential surface 12a of the master shaft 12 including the forming portion N directly affects molding accuracy of a dynamic pressure generating portion, and eventually, bearing performance of a dynamic bearing. Accordingly, it is necessary to increase in advance accuracies in circularity, cylindricality, surface roughness, and the like, which are important for functions of the bearing device.

Figure 2B:
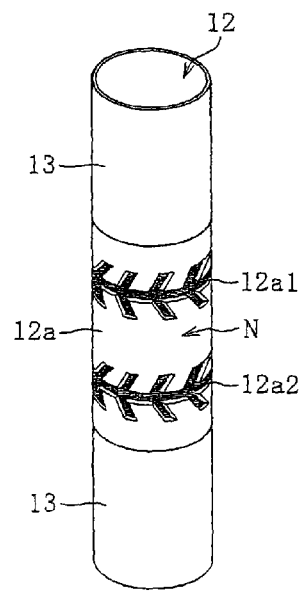
FIG. 2B is a perspective view showing a state where masking is performed for the master shaft.

In the masking step shown in FIG. 2B, a masking 13 is applied to the outer circumferential surface 12a of the master shaft 12, except for the forming portion N. It is possible to use the existing articles which are non-conductive and have corrosion resistance to an electrolytic solution as a material of the masking 13.

Figure 2C:
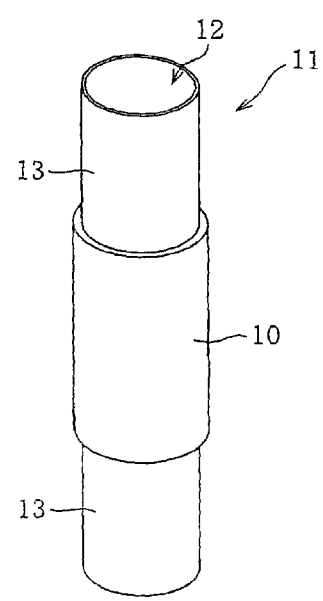
FIG. 2C is a perspective view showing an electroforming shaft.

The electroforming process shown in FIG. 2C is performed in such a manner that the master shaft 12 subjected to the masking process is immersed into an electrolytic solution containing metal ions of Ni, Cu, or the like to cause the target metal to deposit onto the surface of the master shaft 12 by applying power to the electrolytic solution. In the electrolytic solution, a sliding material such as carbon or a stress relaxing material such as saccharin may also be contained according to needs. A type of such the electrodeposited metal is selected as appropriate according to physical properties and chemical properties, such as hardness and fatigue strength, which are required for the dynamic pressure generating portion. With regard to a thickness of the electroforming portion 10, if the electroforming portion 10 is too thick, releasability thereof from the master shaft 12 decreases, and if the electroforming portion 10 is too thin, durability thereof decreases, or the like. Accordingly, the thickness is optimally set according to required bearing performance, a size of the bearing, and further, to a purpose thereof and the like. For example, in a rotational bearing with a shaft diameter of 1 to 6 mm, it is preferable to set the thickness within a range of 10 to 200 μm.

As described above, the electroforming portion 10 is formed by using the method similar to electrolytic plating. Further, the electroforming portion 10 may also be formed by using a method similar to electroless plating.

Through the steps described above, as shown in FIG. 2C, the electroforming shaft 11 is formed, in which the cylindrical electroforming portion 10 adheres to the region (forming portion N) of the outer circumferential surface 12a of the master shaft 12, which excludes the masking 13. At this time, onto an inner circumferential surface of the electroforming portion 10, the irregular shape of the forming portion N formed on the outer circumferential surface 12a of the master shaft 12 is transferred, thus forming the plurality of dynamic pressure grooves as the dynamic pressure generating portion. Note that, when a coating material 3 for the masking is thin, in some cases, as shown by the broken lines of FIG. 3, both ends of the electroforming portion 4 protrude to the coating material 3 side, and tapered chamfered portions 4a are formed on the inner circumferential surface of the electroforming portion.

Next, the electroforming shaft 11 is conveyed, for example, to a molding step shown in FIG. 4, and injection molding (insert molding) using a resin material is performed by using the electroforming shaft 11 as an insert part.

In this molding step, the electroforming shaft 11 is supplied to a metal mold composed of an upper mold 15 and a lower mold 16 in a state where an axial direction thereof is in parallel with a clamping direction (vertical direction in FIG. 4) of the metal mold. In the lower mold 16, a positioning hole 18 corresponding to an outer diameter dimension of the master shaft 12 is formed. Into the positioning hole 18, a lower end of the electroforming shaft 11 conveyed from the previous step is inserted, and positioning is effected for the electroforming shaft 11. In the positioning state, a lower end surface of the electroforming portion 10 in the electroforming shaft 11 engages with a molding surface of the lower mold 16, and an upper end of the electroforming portion 10 protrudes from a parting line P.L. of the metal mold toward the other-half mold (upper mold 15 in this embodiment). A depth L3 of the positioning hole 18 is larger than a distance L4 between a lower end of the master shaft 12 and a lower end of the electroforming portion 10 (L3>L4). Hence, in a state before swaging, a lower end surface of the master shaft 12 is floated from a bottom of the positioning hole 18. By adjusting an amount of the floating, an amount of plastic deformation of a flange formed on the lower end of the electroforming portion 10 can be changed.

In the above-mentioned upper mold 15, a guide hole 19 is formed coaxially with the positioning hole 18. A depth L5 of the guide hole 19 is sufficient if the depth L5 is to an extent where an upper end of the master shaft 12 does not reach or contact a bottom of the guide hole 19 at a time of swaging shown in FIG. 5 (note that the lower end of the master shaft 12 reaches and contacts the bottom of the positioning hole 18).

Figure 5:
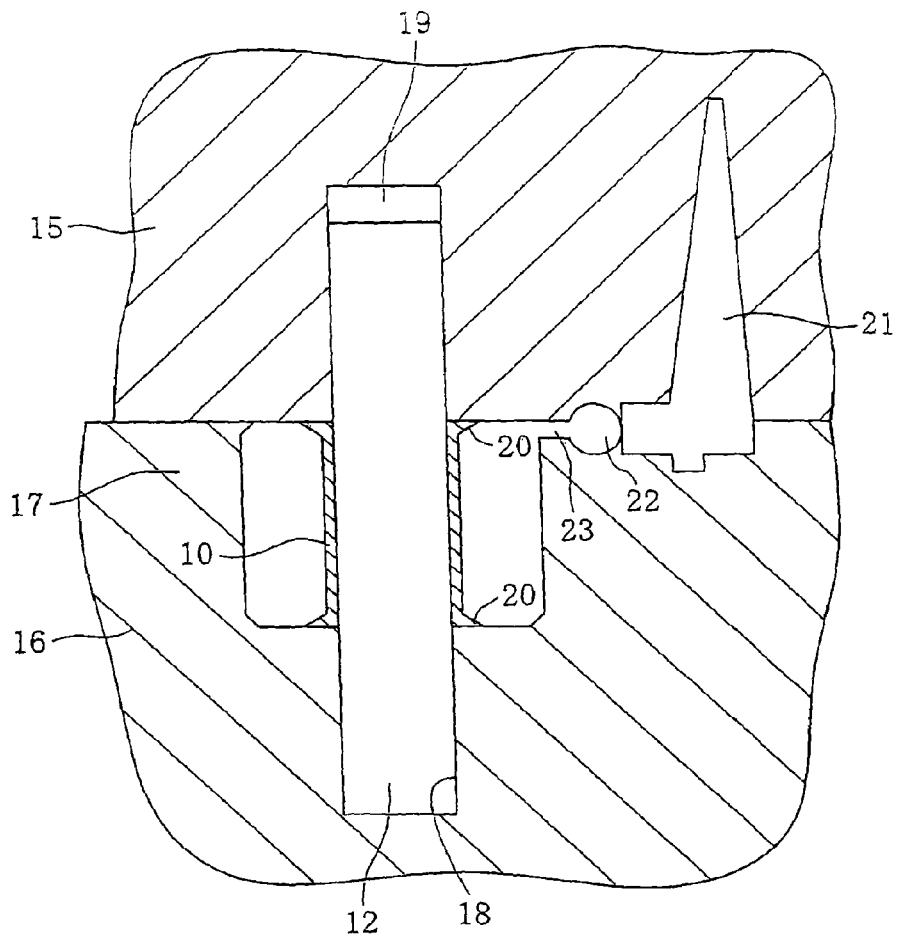
FIG. 5 is a cross-sectional view of the injection molding metal mold.

In the metal mold described above, when the movable mold (upper mold 15 in this embodiment) is made to approach the fixed mold (lower mold 16 in this embodiment) to perform swaging, first, the upper end of the master shaft 12 is inserted into the guide hole 19, and the master shaft 12 is subjected to centering, and further, an upper end surface of the electroforming portion 10 abuts on a molding surface of the upper mold 15. The electroforming shaft 11 is entirely pushed downward by further approach of the upper mold 15. Then, as shown in FIG. 5, the lower end portion of the electroforming portion 10, which abuts on the molding surface of the lower mold 16, and the upper end portion of the electroforming portion 10, which abuts on the molding surface of the upper mold 15, are individually deformed plastically to an outer diameter side, and flanges 20 are formed on both axial ends of the electroforming portion 10. By changing a structure of the metal mold, it is also possible to form the flange 20 on only one axial end of the electroforming portion 10.

After the clamping is completed, the resin material is injected into a cavity 17 through a spool 21, a runner 22, and a gate 23, and the insert molding is performed. As the resin material, the one is preferable, which is excellent in mechanical strength as well as oil resistance, heat resistance, and the like. It is possible to use, for example, high performance crystalline polymer such as liquid crystal polymer (LCP), a polyphenylene sulfide (PPS) resin, a polyacetal (POM) resin, and a polyamide (PA) resin as the resin material. As a matter of course, these are mere examples, and it is possible to select resin materials appropriate for the purpose and using environment of the bearing from a variety of the existing resin materials. According to needs, a variety of fillers such as a reinforcement (in any form including fiber and powder) and a lubricant may also be added to the resin material.

As the resin material, the one is selected, in which a molding shrinkage (predicted value after the addition of the filler) is within a range of 0.02% to 2.0% inclusive (preferably, a range of 0.05% to 1.0% inclusive). According to the verification of the inventors of the present invention, when the molding shrinkage is less than 0.02%, a sufficient adhesion force cannot be ensured between the electroforming portion 10 and the resin, resulting in anxiety about durability of the bearing. On the other hand, it has been found that, when the molding shrinkage exceeds 2.0%, a shrinking force of the resin portion becomes excessive, which adversely affects the surface accuracy of the bearing.

Note that it is also possible to use a metal material as the injected material. Metal injection molding includes molten metal injection molding and metal powder injection molding, and either of those can be adopted in the present invention. The former one is a technology in which metal chips and slugs are molten or semi-molten, then flown into the metal mold, followed by the molding. In particular, when low melting point metal such as a magnesium alloy or an aluminum alloy is used, a melting facility can be downsized. The latter one is a technology in which metal powder and a binder are mixed/kneaded together and caused to flow into the metal mold to be then taken out from the metal mold, and degreased and sintered. This technology is called metal injection molding (MIM) in general. In the case of this MIM molding, the metal to be used is not limited to the low melting point metal such as the magnesium alloy or the aluminum alloy, and other metal materials such as a copper alloy, an iron alloy, and a copper-iron alloy can be widely selected according to the purpose of the bearing. As described above, the metal is used as an injection molding material, thus making it possible to further enhance the strength, the heat resistance, the conductivity, and the like as compared with the case of using the resin material.

In addition to the above-mentioned resin material and the metal material, for example, ceramics can be used. It is possible to use, for example, so-called CIM molding or the like, in which a mixture of ceramic powder and the binder is injection molded, and then is degreased and sintered. In this case, a feature is obtained that the injected material is lighter than the metal material and more excellent than the resin material in rigidity and heat resistance.

Figure 3:
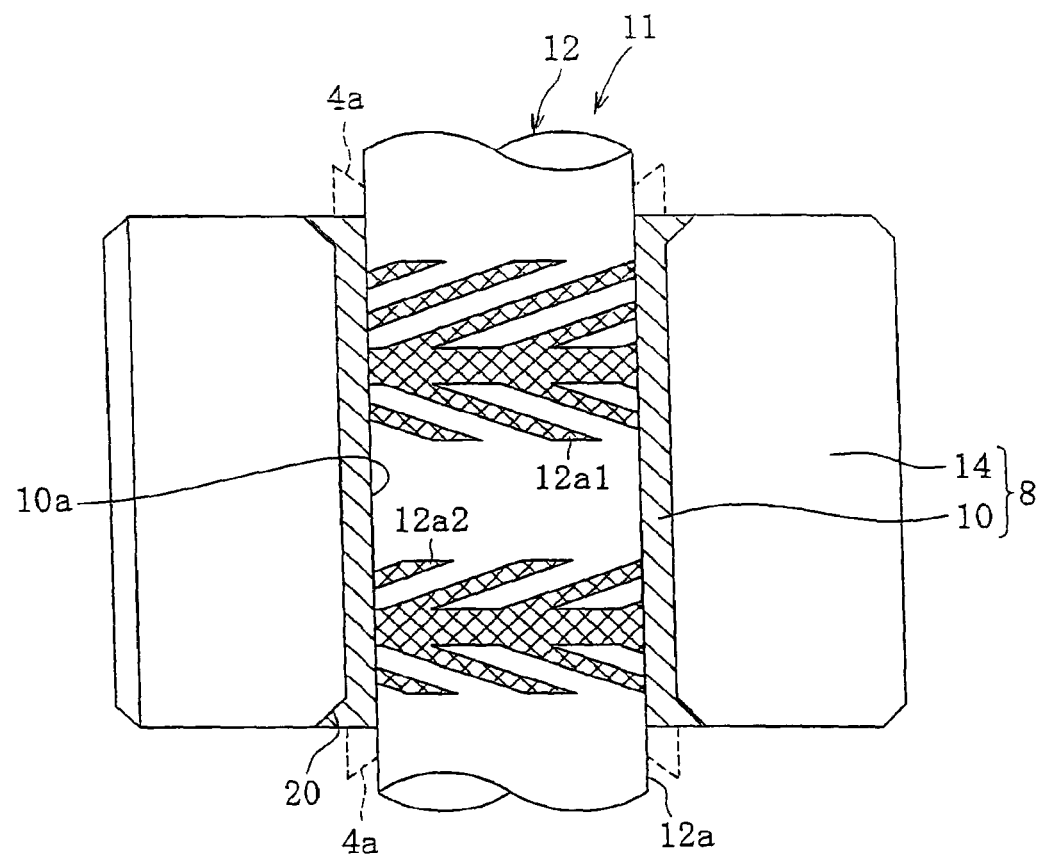
FIG. 3 is a cross-sectional view of the bearing member immediately after insert molding.

After the insert molding is completed, the mold is opened. Then, a molded article as shown in FIG. 3 is obtained, in which the electroforming shaft 11 composed of the master shaft 12 and the electroforming portion 10 and a mold portion 14 are integrated together.

The above-mentioned molded article is then conveyed to a separation step, where the molded article is separated into a member (bearing member 8) in which the electroforming portion 10 and the mold portion 14 are integrated together and into the master shaft 12.

In the separation step, the bearing member 8 and the master shaft 12 are separated from each other. To be specific, for example, by applying an impact to the electroforming shaft 11 or the bearing member 8, a residual stress accumulated in the electroforming portion 10 is released, an inner circumferential surface 10a of the electroforming portion 10 is expanded in a radius direction, and a gap (desirably, larger than a depth of the dynamic pressure grooves) is formed between the inner circumferential surface 10a of the bearing member 8 and the outer circumferential surface 12a of the master shaft 12. By forming the gap, the axial engagement of the irregularities between the radial bearing surfaces A formed on the inner circumferential surface of the bearing member 8 and the forming portion N formed on the outer circumferential surface 12a of the master shaft 12 is cancelled. Hence, the master shaft 12 is drawn out from the bearing member 8 in the axial direction after the electroforming portion 10 is peeled off from the outer circumferential surface 12a of the master shaft 12 by applying the impact to the electroforming shaft 11 or the bearing member 8, thus making it possible to smoothly separate the master shaft 12 and the bearing member 8 from each other without damaging the radial bearing surfaces A. Note that a diameter expansion amount of the electroforming portion 10 can be controlled within a range of 1 μm to several ten μm, for example, by changing the thickness of the electroforming portion 10.

When a sufficient diameter expansion amount cannot be ensured on the inner circumferential surface 10a of the electroforming portion 10 only by releasing the stress, the electroforming portion 10 and the master shaft 12 are heated or cooled, and a difference in thermal expansion amount is generated therebetween, thus also making it possible to separate the master shaft 12 and the bearing member 8 from each other.

In this case, if the master shaft 12 is formed in advance of the metal material or the ceramic material as described above, deformation of the master shaft 12 can be avoided even under a high-temperature/high-pressure environment at the time of the injection molding. Hence, deformation of the forming portion N at the time of the injection molding can be avoided, and accordingly, the radial bearing surfaces A can be formed with high accuracy. Further, the master shaft 12 separated from the electroforming portion 10 can be repeatedly used for the fabrication of the bearing member 8, and the radial bearing surfaces A are formed into a shape corresponding to that of the forming portion N of the master shaft 12. Hence, fabrication cost of the master shaft 12 can be suppressed, and in addition, the bearing member 8 including the dynamic pressure generating portion, in which accuracy is less varied from others and high, can be mass-produced stably.

Note that an outer surface of the electroforming portion 10 is formed into a rough surface owing to characteristics of the electroforming process. Accordingly, at the time of the insert molding, the material constructing the mold portion 14 enters micro irregularities on the outer surface of the electroforming portion, thereby exerting a strong adhesion force due to an anchor effect. Further, as described above, in the present invention, the flanges 20 are formed on the electroforming portion 10, and the electroforming portion 10 is subjected to the insert molding in a form of including the flanges 20 as well. Accordingly, detachment prevention and rotation prevention are effected between the electroforming portion 10 and the mold portion 14. Hence, the adhesion force between the electroforming portion 10 and the mold portion 14 increases, thus making it possible to provide the bearing member 8 having excellent durability and high reliability. In particular, in the case of forming the flanges 20 by plastically deforming the electroforming portion 10 as in the embodiment shown in FIGS. 4 and 5, as shown in FIG. 1, a shape of outer circumferential surfaces 20a of the flanges 20 becomes a non-perfect circular shape having random irregularities. As a result, a high effect of preventing the rotation is obtained. Note that, in FIG. 1, the irregularities of the outer circumferential surfaces 20a are drawn in an exaggerated manner for the purpose of facilitating the understanding.

As described above, in the case of forming the flanges 20 by the plastic deformation, if pressurizing force from the metal mold, which is applied to the electroforming portion 10, is too large, there is a risk that the inner circumferential surface of the electroforming portion 10, which is brought into intimate contact with the master shaft 12, is peeled off from the outer circumferential surface of the master shaft 12 owing to the impact at that time. When the electroforming portion 10 is peeled off, at that moment, the electroforming portion 10 expands in diameter, and a gap is formed with the master shaft 12. Accordingly, at the time of the subsequent injection molding, the inner circumferential surface of the electroforming portion 10 randomly shrinks in diameter due to an injection pressure, and there is a risk that an accuracy decrease of the inner circumferential surface 10a is brought. In order to prevent such the situation, it is necessary to make an effort to prevent the electroforming portion 10 from being peeled off from the master shaft 12 at the time before the injection molding, and this is considered to be achievable by controlling an upper limit of the amount of plastic deformation of the electroforming portion 10.

According to examination from a viewpoint as described above, the following has been found. In the bearing member 8 shown in FIG. 6, when an axial length of the electroforming portion 10 (shown by solid lines in FIG. 6) after the plastic deformation is L1, and an axial length of the electroforming portion 10 (shown by broken lines in FIG. 5) before the plastic deformation is L2, if a change A (=L2−L1) in the axial length of the electroforming portion 10 is within 50% (desirably, within 20%) of the axial length L1 of the electroforming portion 10 after the plastic deformation, the electroforming portion 10 can be prevented from being peeled off owing to the plastic deformation before the injection molding. On the other hand, if A is equal to 0, the flanges 20 cannot be formed. Hence, it is desirable to determine L1 and L2 so as to satisfy the following expression:

$$0 < A/L1 \leq 0.5$$

Figure 7:
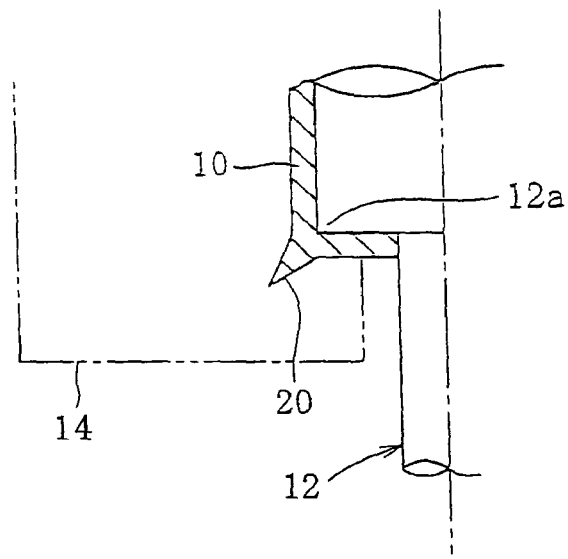
FIG. 7 is a cross-sectional view showing an electroforming step.

In the above description, the case has been shown, where the flanges 20 are formed by the plastic deformation; however, the flanges 20 can also be formed by other methods than the plastic deformation. For example, as shown in FIG. 7, if the master shaft 12 is formed in advance into a shaft shape with a step difference, when the master shaft 12 is immersed into the electrolytic solution in the electroforming step, inclined flanges 20 as shown in FIG. 7 can be formed on corner portions 12a of the master shaft 12 after the end of the electroforming depending on electroforming conditions. This is because, in general, a deposition amount of metal particles increases in the corner portions 12a as compared with that in other smooth portions of the master shaft 12.

Hence, if the electroforming portion 10 including the flanges 20 is formed by the injection molding (as shown by a chain double-dashed line) after the formation of the flanges 20, the effect to prevent the electroforming portion 10 from being peeled off or being rotated can be obtained similarly to the above.

Figure 8:
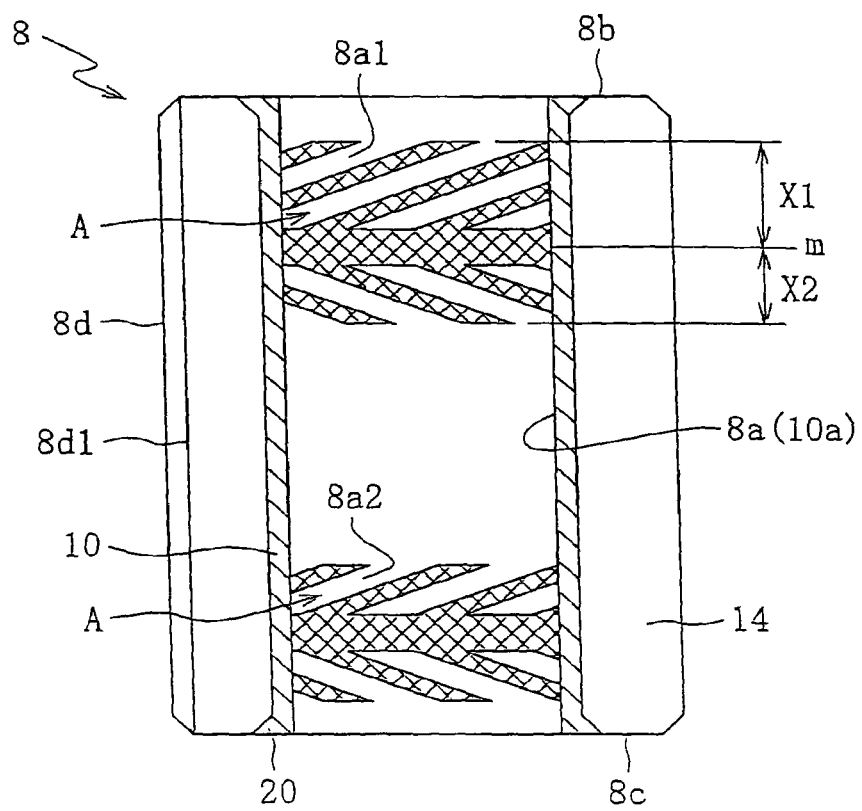
FIG. 8 is a cross-sectional view of the bearing member.

As shown in FIG. 8, on the inner circumferential surface (inner circumferential surface 10a of the electroforming portion 10) of the bearing member 8 from which the master shaft 12 has been separated, the two radial bearing surfaces A composed of a plurality of dynamic pressure grooves 8a1 and 8a2 and the protruding portions for defining the dynamic pressure grooves 8a1 and 8a2 are formed vertically apart from each other. As will be described later, the radial bearing surfaces A form a radial bearing gap with an outer circumferential surface of a shaft member 2 as the bearing member 8 is incorporated into the bearing device.

Figure 9:
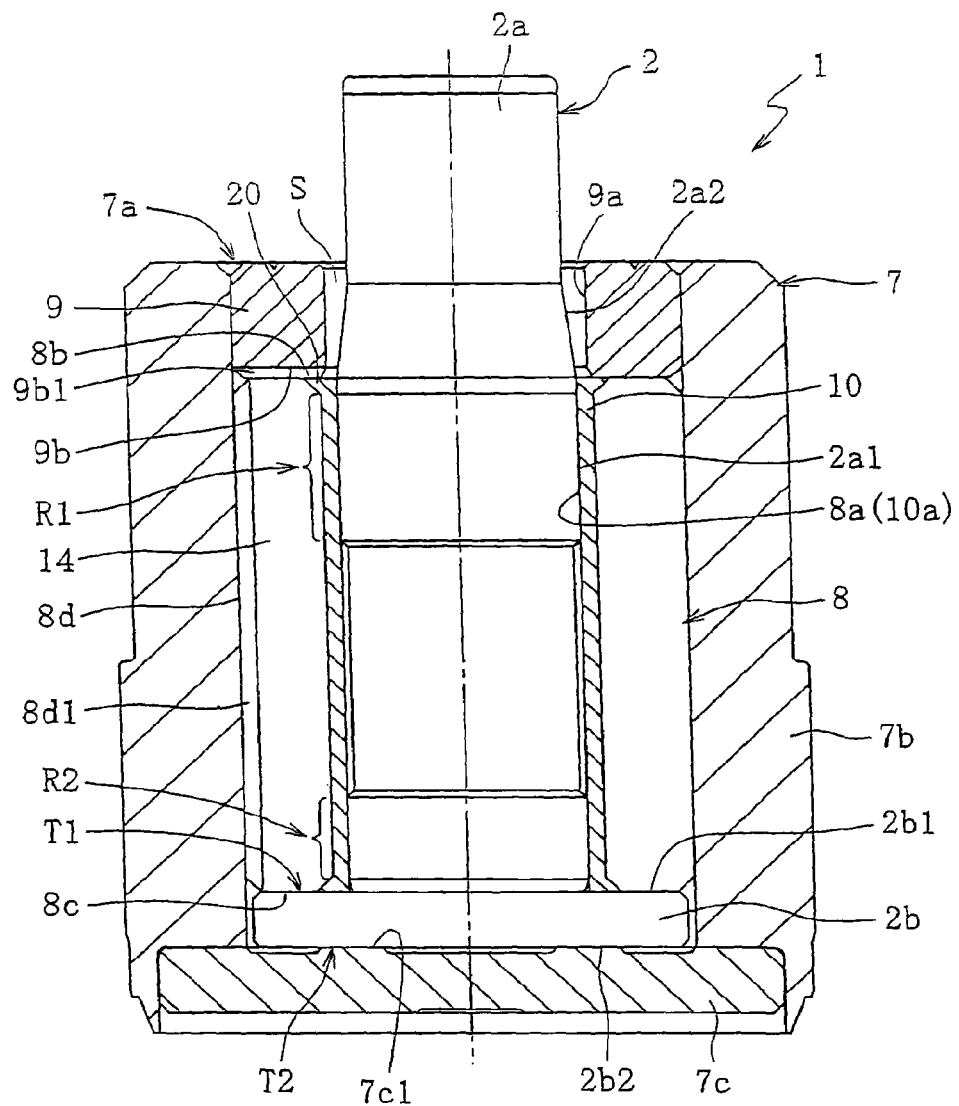
FIG. 9 is a cross-sectional view showing an embodiment of a fluid dynamic bearing device.

Next, an example of a fluid dynamic bearing device 1 using the bearing member 8 fabricated in the above-mentioned steps is shown in FIG. 9. As shown in FIG. 9, the fluid dynamic bearing device 1 includes in addition to the bearing member 8, as main constituent parts, a housing 7 which has a bottom portion 7c on one end thereof, for fixing the bearing member 8 to an inner circumference thereof, the shaft member 2 inserted into the inner circumference of the bearing member 8, and a seal member 9. Note that a description will be made below while defining that the seal member 9 side is an upper side and an axially opposite side to the seal member 9 side is a lower side for the sake of convenience of the description.

The housing 7 is formed into a closed-end cylindrical shape formed of a metal material such as stainless steel or brass or a resin material. The housing 7 includes an opening portion 7a at one end, and the other end thereof is sealed. The housing 7 further includes a cylindrical side portion 7b, and the bottom portion 7c on the opposite end side of the side portion 7b with respect to the opening portion 7a. In this embodiment, the side portion 7b and the bottom portion 7c are formed separately from each other, and the bottom portion 7c is fixed to a lower inner circumference of the side portion 7b by means such as adhesion, press-fitting, and welding. Though not shown, on a partially annular region serving as a thrust bearing surface of the bottom portion 7c, a plurality of dynamic pressure grooves, for example, arranged in a spiral configuration or a herringbone configuration are formed as a dynamic pressure generating portion. This type of dynamic pressure grooves can be molded through a pressing process and the like simultaneously with the molding of the bottom portion 7c. Further, the side portion 7b and the bottom portion 7c can also be formed integrally. Note that the materials for forming the side portion 7b and the bottom portion 7c may be either the same or different from each other as long as the materials can meet performance required therefor.

The shaft member 2 is formed, for example, of a metal material such as stainless steel separately from the above-mentioned master shaft 12. The shaft member is composed of a shaft portion 2a, and a flange portion 2b provided on one end of the shaft portion 2a integrally or separately. An outer circumferential surface of the shaft portion 2a forms a perfect circle in cross section, which does not have the dynamic pressure grooves or the like. The shaft member 2 can also be formed into a hybrid structure composed of a metal portion and a resin portion, as well as is formed only of the metal material (for example, the shaft portion 2a is formed of a metal material, and the flange portion 2b is formed of a resin material). An outer diameter dimension of the shaft portion 2a is slightly smaller than an inner diameter dimension of the protruding portions, which define and form the dynamic pressure grooves 8a1 and 8a2, in the radial bearing surfaces A formed on the bearing member 8. Thus, the radial bearing gap approximately in a range of 1 μm to several ten μm is formed between the outer circumferential surface of the shaft portion 2a and the two radial bearing surfaces A.

To an inner circumference of the opening portion 7a of the housing 7, the seal member 9 formed of a metal material such as brass or a resin material is fixed by means such as the press-fitting and the adhesion. In this embodiment, the seal member 9 forms an annular shape, and is formed separately from the housing 7. An inner circumferential surface 9a of the seal member 9 is opposite to the outer circumferential surface of the shaft portion 2a through a seal space S having a predetermined volume. The outer circumferential surface of the shaft portion 2a, which is opposite to the seal space S, is formed as a tapered surface 2a2 gradually reduced in diameter as extending upward, and also functions as a centrifugal seal when the shaft member 2 is rotated. After the fluid dynamic bearing device 1 is assembled, an inner space of the fluid dynamic bearing device 1 hermetically sealed by the seal member 9 is filled with, for example, lubricating oil as lubricating fluid, and in this state, an oil level of the lubricating oil is maintained within the seal space S. Note that the seal member 9 can also be formed integrally with the housing 7 for the purpose of reducing the number of parts and the number of assembly man-hours.

The bearing member 8 is fixed to an inner circumferential surface of the side portion 7b of the housing 7. With regard to a method of fixing the bearing member 8 to the inner circumference of the housing, fixing means such as the press-fitting, the adhesion, a combination thereof, and the welding is selected according to design conditions. The shaft member 2 is rotatably inserted into the inner circumference of the bearing member 8.

As described above, the bearing member 8 has a composite structure composed of the mold portion 14 formed of the resin material, and the electroforming portion 10 fixed and attached to the inner circumferential surface of the mold portion 14, and the bearing 8 is formed into the cylindrical shape. The mold portion 14 and the electroforming portion 10 are fixed and attached to each other with a strong force over the overall lengths in the axial direction, and the flanges 20 extending in the diameter direction are formed on the upper and lower end portions of the electroforming portion 10, thus detachment prevention and rotation prevention are effected between the mold portion 14 and the electroforming portion 10. The herringbone-shaped dynamic pressure grooves 8a1 and 8a2 are individually formed on the radial bearing surfaces A of the inner circumferential surface 8a of the bearing member 8 by the above-mentioned electroforming process. In this embodiment, the dynamic pressure groove 8a1 in the upper region is formed asymmetrically in the axial direction with respect to an axial center m (axial center of a region across upper and lower inclined grooves), and an axial dimension X1 of an upper region of the dynamic pressure groove 8a1 from the axial center m is larger than an axial dimension X2 of a lower region thereof. Therefore, feeding force (pumping force) of the lubricating oil by the dynamic pressure grooves when the shaft member 2 is rotated is relatively larger in the upper dynamic pressure groove 8a1 than in the lower symmetric dynamic pressure groove 8a2.

Further, though not shown, on a partially annular region serving as a thrust bearing surface of a lower end surface 8c of the bearing member 8, a plurality of dynamic pressure grooves arrayed, for example, in a spiral shape are formed as dynamic pressure generating portions. This type of dynamic pressure grooves can be molded simultaneously with the forming of the bearing member 8 as long as a groove shape is formed in advance on a region of the lower mold 16, which is opposite to the lower end surface 8c. In this case, the lower mold 16 is the one to be used in the molding step of forming the above-mentioned bearing member 8. By the simultaneous molding described above, a work of separately forming the dynamic pressure grooves on the lower end surface 8c can be omitted.

The fluid dynamic bearing device 1 is constructed as described above, and when the shaft member 2 is rotated, the two upper and lower regions of the inner circumferential surface 8a of the bearing member 8, which serve as the radial bearing surfaces A, are individually opposite to an outer circumferential surface 2a1 of the shaft portion 2a through the radial bearing gap. Then, as the shaft member 2 is rotated, dynamic pressure of the lubricating oil is generated in the above-mentioned radial bearing gap, and by the pressure, the shaft portion 2a of the shaft member 2 is supported in a non-contact fashion with the bearing member 8 rotatably in the radial direction. Thus, a first radial bearing portion R1 and a second radial bearing portion R2, which support the bearing member 2 rotatably in the radial direction in a non-contact fashion therewith, are formed.

Further, the region of the lower end surface 8c of the bearing member 8, which serves as the thrust bearing surface, is opposite to an upper end surface 2b1 of the flange portion 2b through the thrust bearing gap, and a region of an upper end surface 7c1 of the bottom portion 7c, which serves as the thrust bearing surface, is opposite to a lower end surface 2b2 of the flange portion 2b through the thrust bearing gap. Then, as the shaft member 2 is being rotated, the dynamic pressure of the lubricating oil is also generated in the thrust bearing gaps. By using the pressure, the shaft member 2 is supported in a non-contact fashion with the housing 7 and the bearing member 8 rotatably in both of the thrust directions. Thus, a first thrust bearing portion T1 and a second thrust bearing portion T2 for supporting the shaft member 2 in such a non-contact fashion rotatably in both of the thrust directions, are formed.

Note that, while the shaft member 2 is being rotated, the lubricating oil is forced into the bottom side of the housing 7. Accordingly, if such the state continues, the pressure of the lubricating oil in the thrust bearing gaps of the thrust bearing portions T1 and T2 increases to an extreme extent, so there is a fear that bubbles may be generated in the lubricating oil, that the lubricating oil may leak, or that vibrations may occur, all of which may result from the extreme increase of the pressure. In this case, as shown in FIGS. 8 and 9, circulation paths 8d1 and 9b1 which allow the thrust bearing gaps (in particular, the thrust bearing gap of the first thrust bearing portion T1) and the seal space S to communicate with each other are provided on an outer circumferential surface 8d of the bearing member 8 and a lower end surface 9b of the seal member 9, respectively. Then, the lubricating oil flows between the thrust bearing gaps and the seal space S through the circulation paths 8d1 and 9b1, and the pressure difference is released early, and such harmful effects as described above can be prevented. As an example, FIG. 9 shows a case where the circulation path 8d1 is formed on the outer circumferential surface 8d of the bearing member 8, and a case where the circulation path 9b1 is formed on the lower end surface 9b of the seal member 9. However, the circulation path 8d1 can also be formed on the inner circumferential surface of the housing 7, and the circulation path 9b1 can also be formed on the upper end surface 8b of the bearing member 8.

Figure 10:
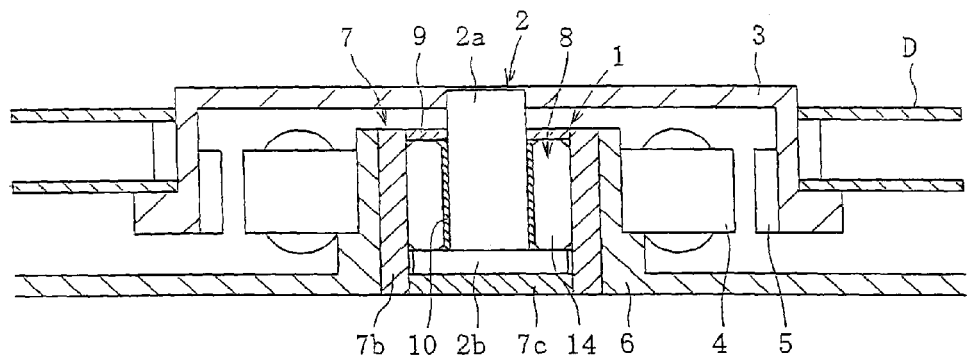
FIG. 10 is a cross-sectional view showing an example of a spindle motor using the fluid dynamic bearing device of the present invention.

FIG. 10 shows a construction example of a spindle motor for an information apparatus, into which the fluid dynamic bearing device 1 shown in FIG. 9 is incorporated. The spindle motor is the one to be used for a disk drive device such as an HDD, and includes the fluid dynamic bearing device 1 for rotatably supporting the shaft member 2 in a non-contact fashion, a rotor (disk hub) 3 attached to the shaft member 2, and a stator coil 4 and a rotor magnet 5, both of which are opposed to each other through a radial gap. The stator coil 4 is attached to an outer circumference of a bracket 6, and the rotor magnet 5 is attached to an inner circumference of the disk hub 3. The housing 7 of the fluid dynamic bearing device 1 is attached to an inner circumference of the bracket 6. On the disk hub 3, one or a plurality of disks D such as magnetic disks are held. When the stator coil 4 is energized, the rotor magnet 5 is rotated by an electromagnetic force between the stator coil 4 and the rotor magnet 5, and the disk hub 3 and the shaft member 2 are thereby rotated integrally with each other.

Figure 6:
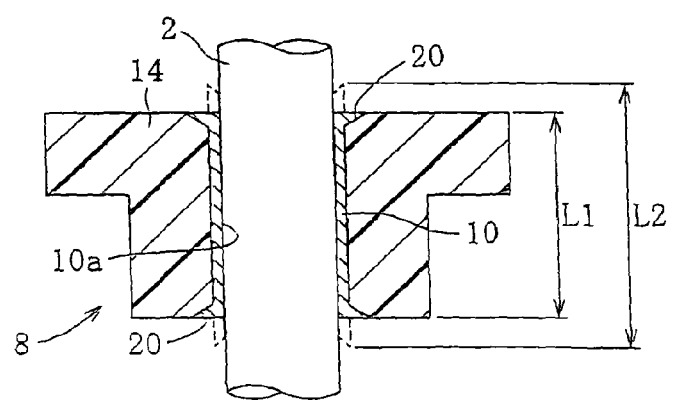
FIG. 6 is a cross-sectional view of the bearing device.
Figure 11:
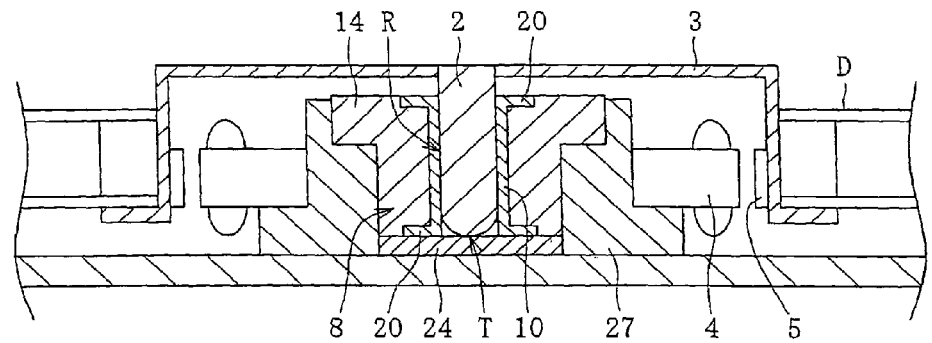
FIG. 11 is a cross-sectional view showing another example of the spindle motor using the fluid dynamic bearing device of the present invention.

FIG. 11 shows a construction example of a fluid dynamic bearing device, and further, a motor, using the bearing member 8 of the embodiment shown in FIG. 6. The motor has a radial bearing portion R for supporting the shaft member rotatably in the radial direction, and a thrust bearing portion T for supporting the shaft member rotatably in the thrust direction. The radial bearing portion R is constructed by inserting the shaft member 2 into the inner circumference of the bearing member 8, and the thrust bearing portion T is constructed by supporting a convex spherical shaft end of the shaft member 2 by a thrust plate 24 opposed to an end surface of the bearing member 8 in a contact fashion therewith.

In the disk drive device such as the HDD, there is a risk that the disks D are charged with static electricity by friction with the air, and the charged static electricity is discharged instantaneously to peripheral devices such as a magnetic head, thus adversely affecting the peripheral devices. In particular, when the thrust plate 23 is made of the resin, or when the thrust bearing portion T is composed of the dynamic bearing, a tendency to bring such the adverse effect becomes significant. On the other hand, when the mold portion 14 is formed by the injection molding of the metal material, the static electricity built up on the disks D is discharged rapidly to a ground side through a route of the shaft member 2→the electroforming portion 4→the mold portion 14→a bracket 27. Hence, the disks D can be restricted from being charged with the static electricity, and a spark can be prevented from occurring between the disks and the peripheral devices.

The above-mentioned bearing member 8 can be used not only for the fluid dynamic bearing device 1 shown in FIG. 9 but also widely for fluid dynamic bearing devices with other constructions. A description will be made below of the other constructions of the fluid dynamic bearing device with reference to the drawings. Common reference symbols will be assigned to members having the same constructions as and common functions to those of the fluid dynamic bearing device 1 shown in FIG. 9, and a repeated description will be omitted.

Figure 12:
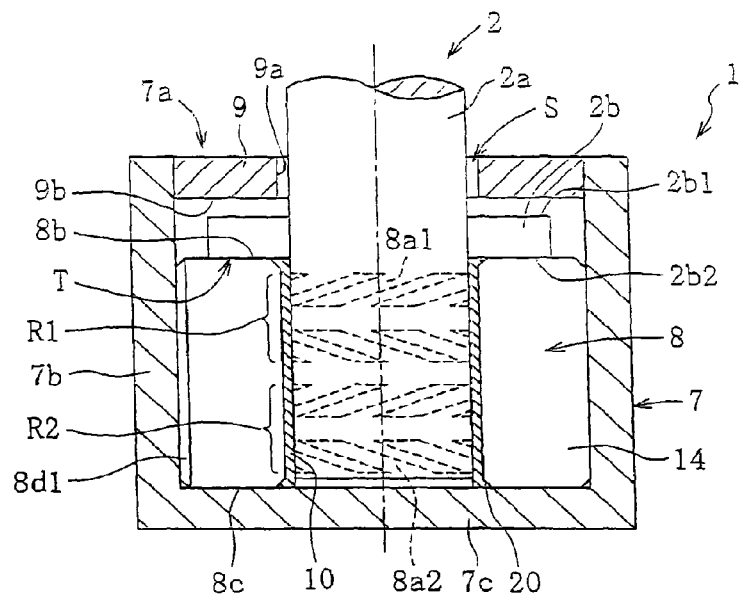
FIG. 12 is a cross-sectional view showing another embodiment of the fluid dynamic bearing device.

A fluid dynamic bearing device shown in FIG. 12 is the one, in which the thrust bearing portion T is disposed on the opening portion 7a side of the housing 7, and supports the shaft member 2 in a non-contact fashion with the bearing member 8 in one thrust direction. The flange portion 2b is provided above the lower end of the shaft member 2, and the thrust bearing gap of the thrust bearing portion T is formed between a lower end surface 2b2 of the flange portion 2b and the upper end surface 8b of the bearing member 8. The seal member 9 is attached to an inner circumference of the opening portion of the housing 7, and the seal space S is formed between the inner circumferential surface 9a of the seal member 9 and the outer circumferential surface of the shaft portion 2a of the shaft member 2. The lower end surface 9b of the seal member 9 is opposite to the upper end surface 2b1 of the flange portion 2b through an intermediation of an axial gap. When the shaft member 2 is displaced upwards, the upper end surface 2b1 of the flange portion 2b engages with the lower end surface 9b of the seal member 9, thereby preventing the shaft member 2 from being drawn out.

Figure 13:
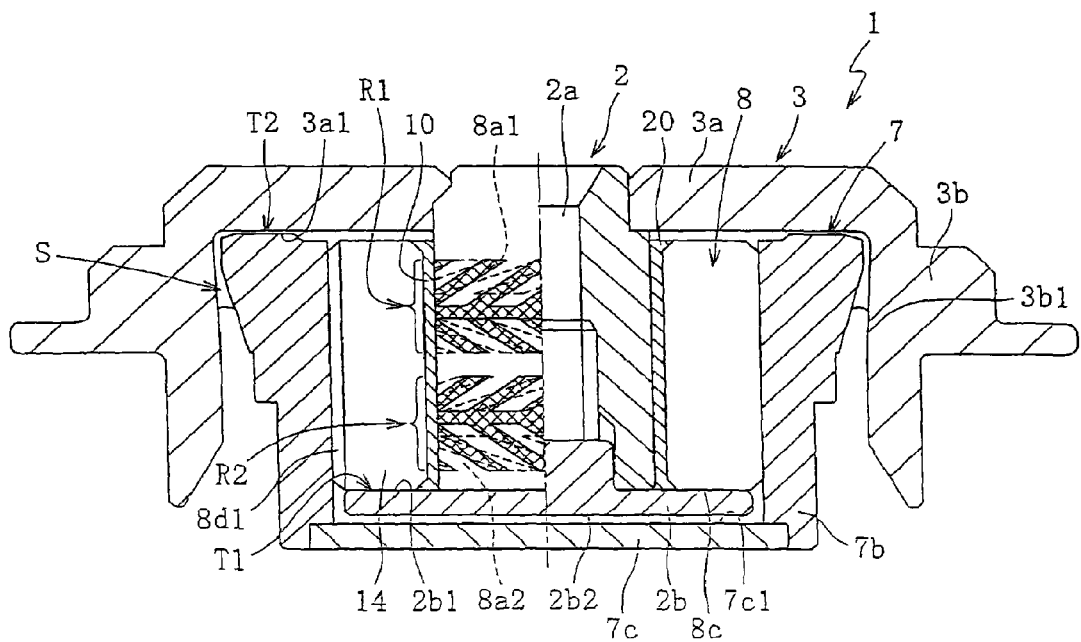
FIG. 13 is a cross-sectional view showing still another embodiment of the fluid dynamic bearing device.

FIG. 13 is a view showing another embodiment of the fluid dynamic bearing device 1. The fluid dynamic bearing device 1 shown in FIG. 13 is different from the fluid dynamic bearing device 1 shown in FIG. 9 mainly in the following points. To be specific, in FIG. 13, the seal space S is formed on an outer diameter portion of the housing 7, and the thrust bearing portion T2 is formed between the upper end surface of the housing 7 and a lower end surface 3a1 of a plate portion 3a constructing the disk hub 3.

Figure 15:
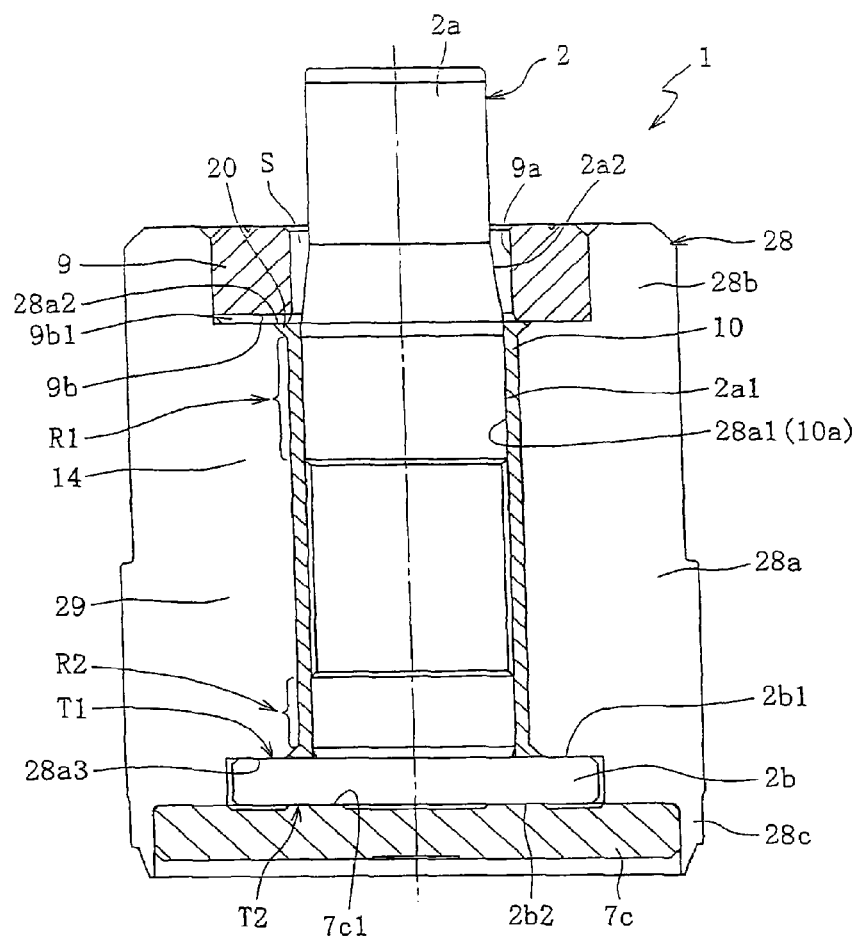
FIG. 15 is a cross-sectional view showing still another embodiment of the fluid dynamic bearing device.

FIG. 15 is a view showing still another embodiment of the fluid dynamic bearing device 1. This embodiment is largely different from the embodiment shown in FIG. 9 in that a bearing member 28 is formed integrally with the housing 7 in a form of including the housing 7. In terms of a structure thereof, as in the bearing member 8 shown in FIG. 9, the bearing member 28 is also composed of the mold portion 14 formed of the resin material (metal material in some cases), and the electroforming portion 10 fixed and attached to the inner circumferential surface of the mold portion 14. In terms of a shape thereof, the bearing member 28 is composed of a sleeve-like sleeve portion 28a capable of inserting the shaft portion 2a into an inner circumference thereof, a seal fixing portion 28b extending upward from an outer diameter side of the sleeve portion 28a and capable of fixing the seal member 9 to an inner circumference of the fixing portion 28b itself, and a bottom fixing portion 28c extending downward from the outer diameter side of the sleeve portion 28a and capable of fixing the bottom portion 7c to an inner circumference of the bottom fixing portion 28c itself. In the sleeve portion 28a, an axial circulation path 29 for allowing an upper end surface 28a2 and a lower end surface 28a3 thereof to communicate with each other, is provided. In this embodiment, the bearing member 28 is molded while including a portion serving as the housing in the molding step shown in FIG. 4. Accordingly, the number of parts and the number of assembly man-hours are reduced, thus making it possible to achieve cost reduction of the fluid dynamic bearing device 1.

Figure 16:
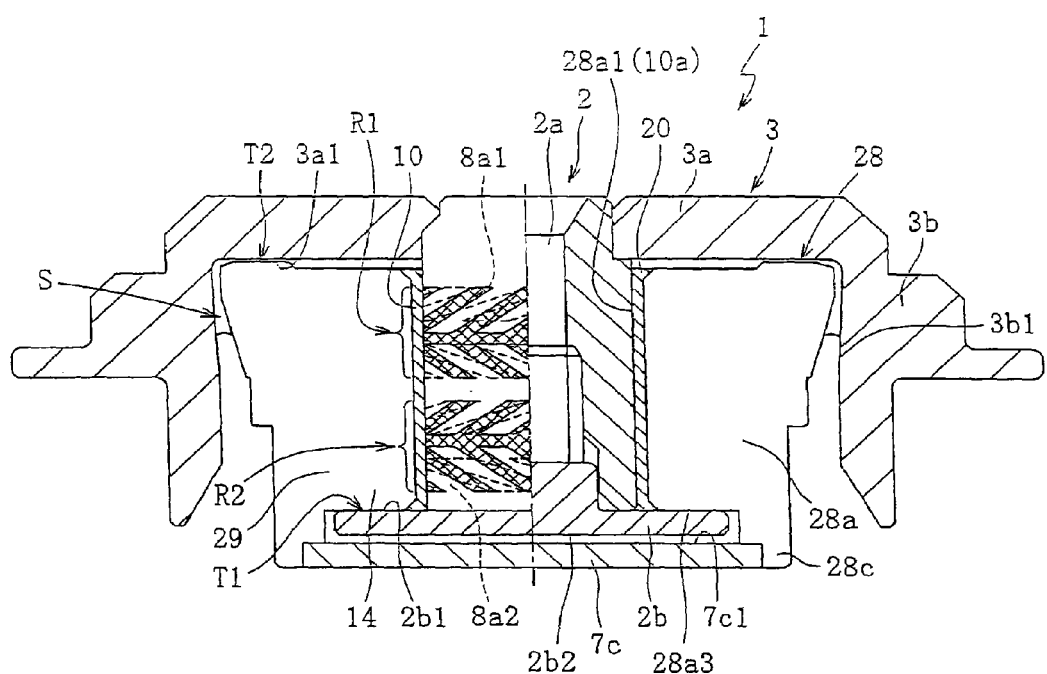
FIG. 16 is a cross-sectional view showing yet another embodiment of the fluid dynamic bearing device.

FIG. 16 is a view showing yet another embodiment of the fluid dynamic bearing device 1. This embodiment is largely different from the embodiment shown in FIG. 13 in that, as in the embodiment shown in FIG. 15, the bearing member 28 is formed integrally with the housing 7 in a form of including the housing 7 which is a separate body in FIG. 13. Also in this embodiment, the number of parts and the number of assembly man-hours are reduced, thus making it possible to achieve the cost reduction of the fluid dynamic bearing device 1.

As constructions of the radial bearing portions R1 and R2 and the thrust bearing portions T, T1 and T2, the above description shows the constructions with which the fluid dynamic pressure is generated by using the herringbone-shaped and the spiral-shaped dynamic pressure grooves. However, the present invention is not limited to this.

For example, so-called multi-lobe bearing and step bearing may also be employed as the radial bearing portions R1 and R2. In those bearings, a plurality of circular arc surfaces (in the multi-lobe bearing) and a plurality of axial grooves (in the step bearing) serve as the dynamic pressure generating portions for generating the dynamic pressures in the radial bearing gaps. Those dynamic pressure generating portions are formed on the electroforming portion 10 of the bearing member 8, and a forming method thereof conforms to the respective steps (refer to FIGS. 2A to 2C and 5) in the case of forming the dynamic pressure grooves. Accordingly, a description thereof will be omitted.

Figure 17:
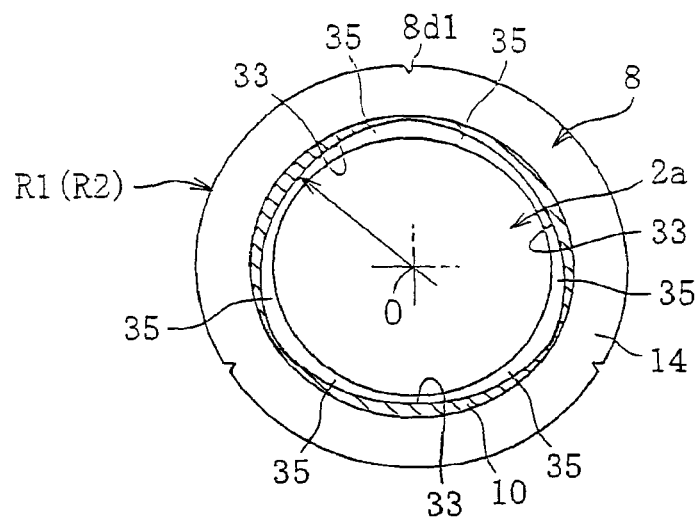
FIG. 17 is a cross-sectional view showing another embodiment of a radial bearing portion.

FIG. 17 shows an example of the case where one or both of the radial bearing portions R1 and R2 are composed of the multi-lobe bearings. In this example, the region of the inner circumferential surface 8a of the bearing member 8, which serves as the radial bearing surfaces, is composed of three circular arc surfaces 33 (this is a so-called three-lobe bearing). Centers of curvatures of the three circular arc surfaces 33 are individually offset by equal distances from a shaft center O of the bearing member 8 (bearing portion 2a). In regions defined by the three circular arc surfaces 33, the radial bearing gaps are wedge-like gaps 35 each of which is reduced gradually into wedge shapes in both circumferential directions. Therefore, when the bearing member 8 and the shaft portion 2a are rotated relatively to each other, the lubricating oil in the radial bearing gap is forced into the minimum gap side of the wedge-like gaps 35 in response to a direction of such relative rotation, and the pressure thereof rises. By the dynamic pressure action of the lubricating oil, which is as described above, the bearing member 8 and the shaft portion 2a are supported in a non-contact fashion. Note that deeper axial grooves called separating grooves may also be formed on boundary portions between the three circular arc surfaces 33.

Figure 18:
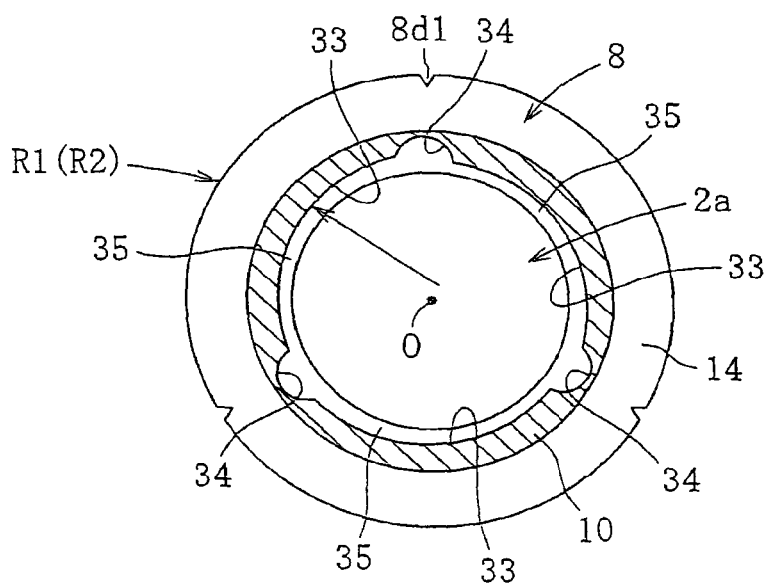
FIG. 18 is a cross-sectional view showing another embodiment of the radial bearing portion.

FIG. 18 shows another example of the case where one or both of the radial bearing portions R1 and R2 are composed of the multi-lobe bearings. Also in this example, a region of the inner circumferential surface 8a of the bearing member 8, which serves as the radial bearing surfaces A, is composed of the three circular arc surfaces 33 (this is the so-called three-lobe bearing). However, in the regions defined by the three circular arc surfaces 33, the radial bearing gaps are wedge-like gaps 35 each of which is reduced gradually into wedge shapes in one circumferential direction. The multi-lobe bearing with such the construction is sometimes called a tapered bearing. Further, deeper axial grooves called separating grooves 34 are formed on boundary portions between the three circular arc surfaces 33. Therefore, when the bearing member 8 and the shaft portion 2a rotates relatively to each other in a predetermined direction, the lubricating oil in the radial bearing gap is forced into the minimum gap side of the wedge-like gaps 35, and the pressure thereof rises. By the dynamic pressure action of the lubricating oil, which is as described above, the bearing member 8 and the shaft portion 2a are supported in a non-contact fashion.

Figure 19:
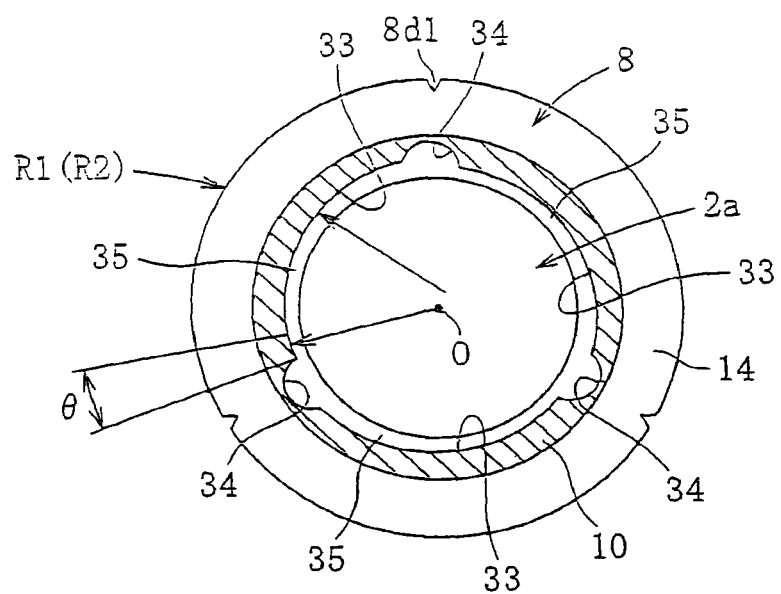
FIG. 19 is a cross-sectional view showing still another embodiment of the radial bearing portion.

FIG. 19 shows still another example of the case where one or both of the radial bearing portions R1 and R2 are composed of the multi-lobe bearings. In this example, in the construction shown in FIG. 18, each of predetermined regions θ on the minimum gap side of the three circular arc surface 33 is composed of a circular arc concentric with the bearing member 8 (shaft portion 2a) by taking the shaft center O thereof as the center of curvature. Hence, in the each predetermined region θ, the radial bearing gap (minimum bearing gap) becomes constant. The multi-lobe bearing with such the construction is sometimes called a taper flat bearing.

Figure 20:
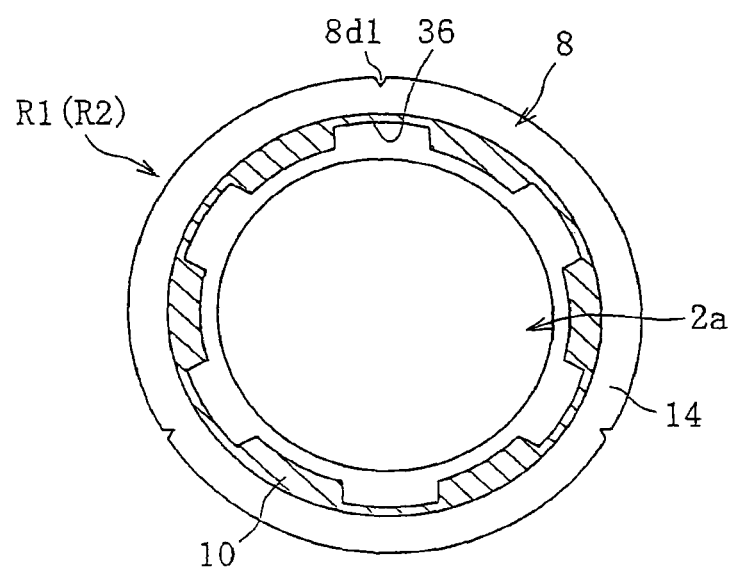
FIG. 20 is a cross-sectional view showing yet another embodiment of the radial bearing portion.

FIG. 20 shows an example of a case where one or both of the radial bearing portions R1 and R2 are composed of the step bearings. In this example, in the region of the inner circumferential surface 8a of the bearing member 8, which serves as the radial bearing surfaces, a plurality of axial groove-shaped dynamic pressure grooves 36 are provided at a predetermined interval in the circumferential direction.

The multi-lobe bearings in the above-mentioned respective examples are the so-called three-lobe bearings. However, without being limited to this, a so-called four-lobe bearing, five-lobe bearing, and a multi-lobe bearing composed of circular arc surfaces of which circular arcs are six or more, may also be employed. Further, when the radial bearing portion is composed of the step bearing or the multi-lobe bearing, it is possible to adopt a construction in which a single radial bearing portion is provided over the upper and lower regions of the inner circumferential surface 8a of the bearing member 8, as well as a construction in which the two radial bearing portions are provided axially apart from each other like the radial bearing portions R1 and R2. Those dynamic pressure generating portions are formed of the electroforming portion 10 of the bearing member 8, and a forming method thereof conforms to the respective steps (refer to FIGS. 2A to 2C) in the case of forming the dynamic pressure grooves. Accordingly, a description thereof will be omitted.

Further, with regard to forms of the thrust bearing portions T, T1 and T2, the constructions with which the dynamic pressure action of the lubricating oil is generated by the spiral-shaped dynamic pressure grooves have been shown. However, such the thrust bearing portion can also be composed of a so-called step bearing in which a plurality of dynamic pressure grooves with a radial groove shape are provided in the region serving as the thrust bearing surface, of a so-called wave-shaped bearing (in which the step shape turns to a wave shape), and the like (not shown).

Figure 14:
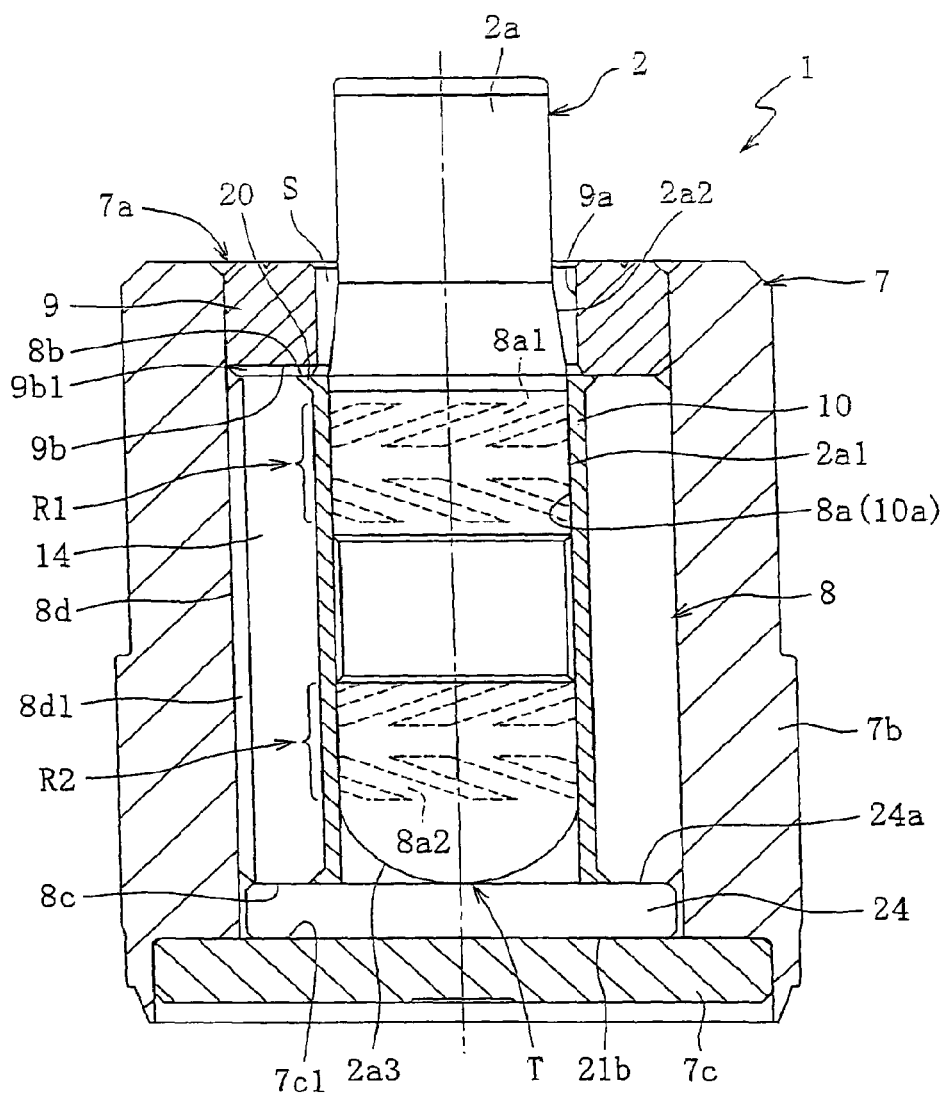
FIG. 14 is a cross-sectional view showing another embodiment of the fluid dynamic bearing device.

The above-mentioned embodiments show that the fluid dynamic bearing device 1 is composed of the dynamic bearing which supports the shaft member 2 in a non-contact fashion therewith in the thrust direction. However, the fluid dynamic bearing device 1 shown in FIG. 14 is composed of a pivot bearing which supports the shaft member 2 in a contact-fashion therewith in the thrust direction. In this case, a lower end 2a3 of the shaft portion 2a of the shaft member 2 is formed into a convex spherical shape, and the lower end 2a3 is supported in a contact fashion by an upper end surface 24a of the thrust plate 24 fixed to the upper end surface 7c1 of the bottom portion 7c of the housing 7 by means such as adhesion.

Not only the radial bearing surfaces but also thrust bearing surfaces can be formed on the electroforming portion 10. A description will be made below of an embodiment of this case with reference to FIGS. 21 to 32.

Figure 21:
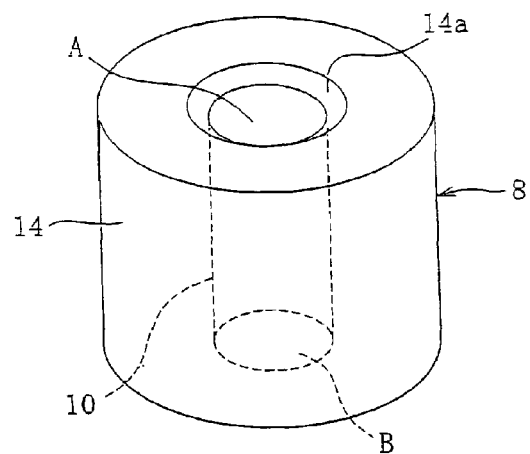
FIG. 21 is a perspective view of a bearing member according to the present invention.

A bearing member 8 having a construction of the present invention, which is shown in FIG. 21, is fabricated through a step of fabricating a master shaft 12 (refer to FIG. 22A), a step of masking a spot of the master shaft 12, which requires the masking (refer to FIG. 22B), a step of forming an electroforming shaft 11 by performing the electroforming process for an unmasked portion N of the master shaft 12 (refer to FIG. 22C), a step of forming a bearing member 8 by molding an electroforming portion 10 of the electroforming shaft 11 with a resin and the like (refer to FIG. 25), and a step of separating the electroforming portion 10 and the master shaft 12 from each other.

Figure 22A:
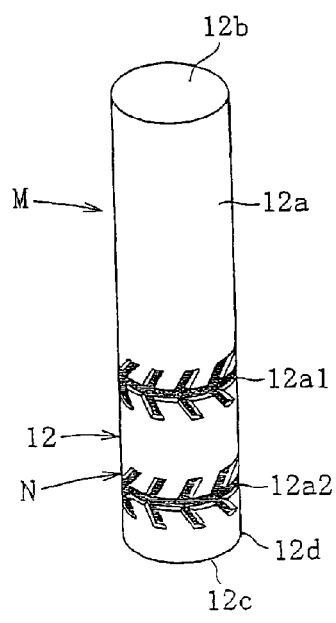
FIG. 22A is a perspective view of a master shaft.
Figure 22B:
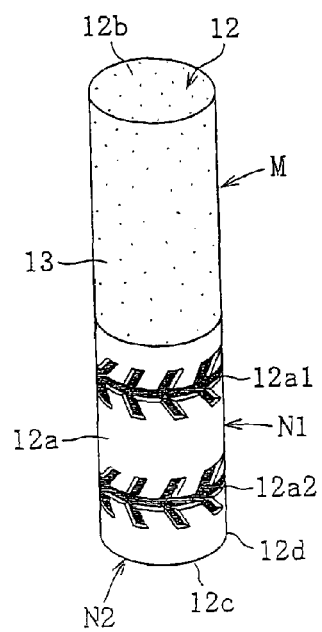
FIG. 22B is a perspective view showing a state where masking is performed for the master shaft.
Figure 22C:
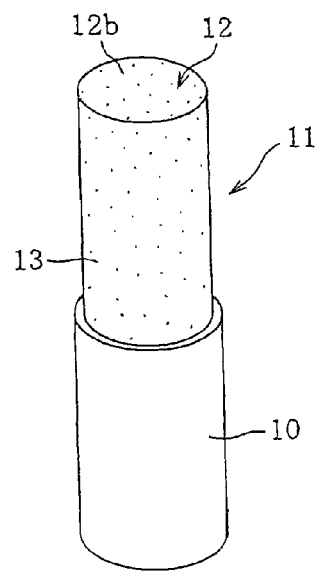
FIG. 22C is a perspective view showing an electroforming shaft.

The above-mentioned steps shown in FIGS. 22A to 22C are basically common to the steps shown in FIGS. 2A to 2C, and accordingly, common matters will be omitted below, and a description will be mainly made below of different matters.

In the masking step shown in FIG. 22B, the masking 13 (shown by a scatter pattern) is applied to an upper portion of an outer circumferential surface of the master shaft 12 and to an upper end surface thereof. On such the portions (masked portion M) subjected to the masking, electroforming metal is not electrolytically deposited at the time of an electroforming process to be described later, and the electroforming portion 10 is not formed. Meanwhile, the masking is not applied to the outer circumferential surface and lower end surface of the master shaft 12, except for the masked portion M, and such the portions (unmasked portion N) which are not subjected to the masking become forming portions for forming an inner circumferential surface (radial bearing surfaces A) of the electroforming portion 10 and an inner bottom surface (thrust bearing surface B) thereof at the time of the electroforming process.

As shown in FIGS. 22A and 22B, in the unmasked portion N of the master shaft 12, on the outer circumferential surface of the master shaft 12, a radial bearing surface forming portion N1 having an irregular shape corresponding to a dynamic pressure groove pattern of the radial bearing surfaces A is formed. Aspects of irregularities of the radial bearing surfaces A and the radial bearing surface forming portion N1 are completely opposite to each other, and protruding portions of the radial bearing surfaces A correspond to recessed portions 12a1 and 12a2 of the radial bearing surface forming portion N1. The shown example illustrates the case where the recessed portions 12a1 and 12a2 of the radial bearing surface forming portion N1 correspond to the herringbone-shaped dynamic pressure groove pattern. However, the recessed portions 12a1 and 12a2 can also be formed into a shape corresponding to the spiral-shaped dynamic pressure groove pattern.

Figure 23:
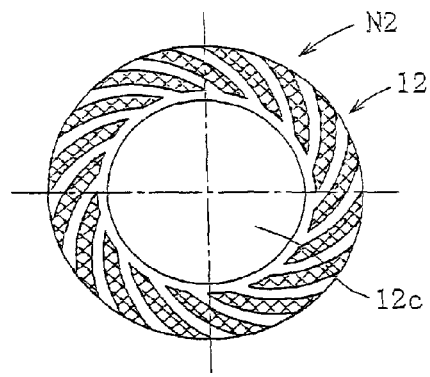
FIG. 23 is a plan view showing a shaft end of the master shaft.

In a similar way to the above, in the unmasked portion N, on a partially annular region of a lower end surface 12c of the master shaft 12, as shown in FIG. 23, a thrust bearing surface forming portion N2 having an irregular shape corresponding to a dynamic pressure groove pattern of the thrust bearing surface B to be described later is formed. Also on the thrust bearing surface forming portion N2, an aspect of irregularities thereof is completely opposite to that of the thrust bearing surface B. The shown example illustrates the case where the thrust bearing surface forming portion N2 corresponds to a spiral-shaped dynamic pressure groove pattern. However, the thrust bearing surface forming portion N2 can also be formed into a shape corresponding to a pattern of a herringbone-shaped dynamic pressure groove.

Figure 24:
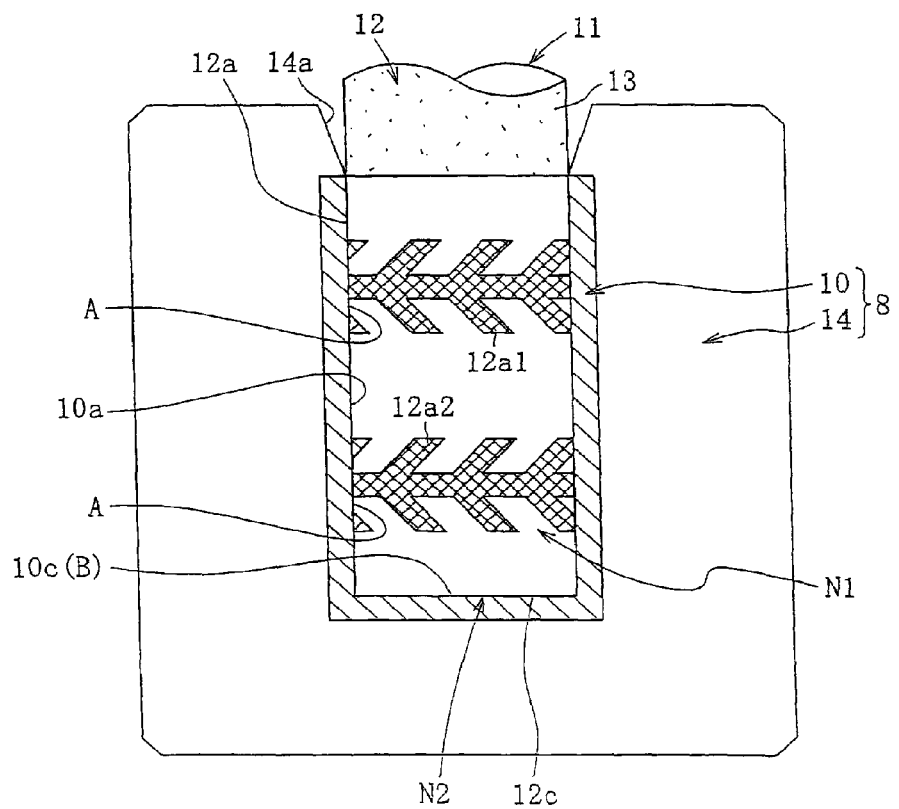
FIG. 24 is a cross-sectional view of the bearing member immediately after insert molding.

By being subjected to the steps described above, as shown in FIG. 22C, the electroforming shaft 11 is formed, in which the closed-end cylindrical electroforming portion 10 is coated on the unmasked region N of the outer circumferential surface 12a and lower end surface 12c of the master shaft 12. At this time, as shown in FIG. 24, onto an inner circumferential surface 10a of the electroforming portion 10, a shape of the radial bearing surface forming portion N1 of the outer circumferential surface 12a of the master shaft 12 is transferred, and the radial bearing surfaces A having a plurality of dynamic pressure grooves 8a1 and 8a2 are formed apart from each other in the axial direction. Further, onto an inner bottom surface 10c of the electroforming portion 10, a shape of the thrust bearing surface forming portion N2 of the lower end surface 12c of the master shaft 12 is transferred, and the thrust bearing surface B having the plurality of dynamic pressure grooves is formed (not shown).

Figure 25:
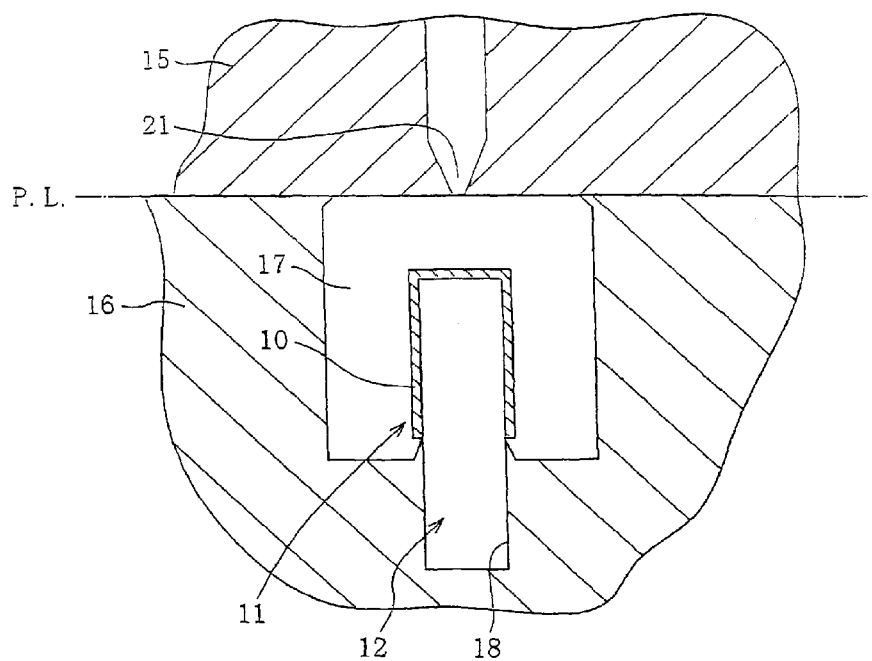
FIG. 25 is a cross-sectional view showing a molding step.

Next, the electroforming portion 11 is conveyed to a molding step shown in FIG. 25, and injection molding (insert molding) using a resin material is performed while taking the electroforming shaft 11 as an insert part.

When the mold is opened after solidifying the resin material, as shown in FIG. 24, a molded article is obtained, in which the electroforming shaft 11, composed of the master shaft 12 and the electroforming portion 10, and a mold portion 14 are integrated together.

The above-mentioned molded article is then conveyed to a separation step, where the molded article is separated into the one (bearing member 8), in which the electroforming portion 10 and the mold portion 14 are integrated together, and the master shaft 12.

Figure 27:
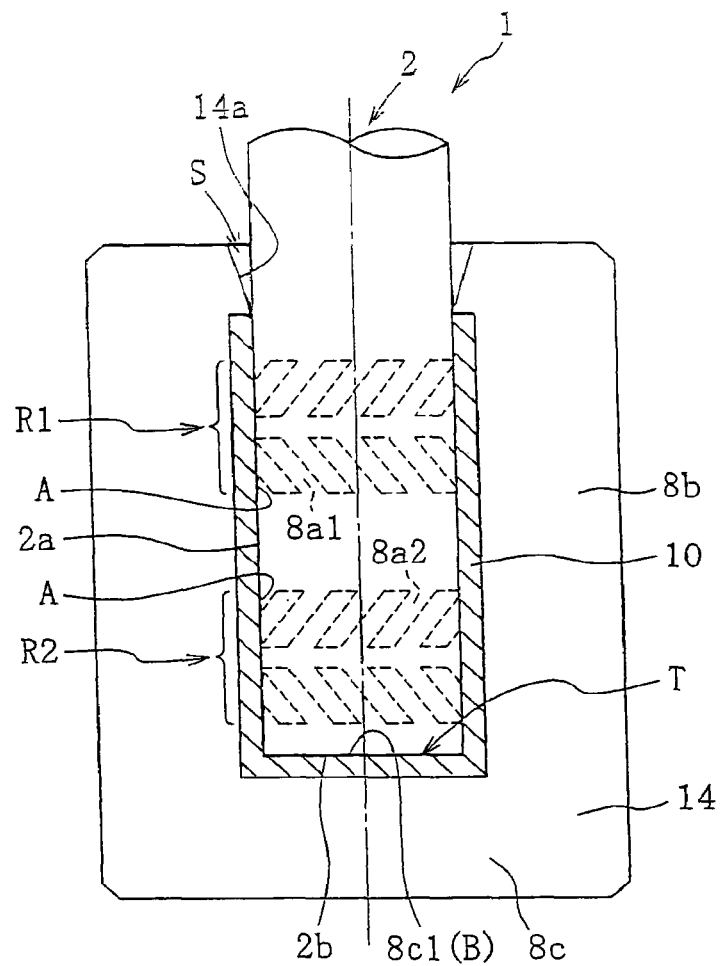
FIG. 27 is a cross-sectional view showing an embodiment of the fluid dynamic bearing device.

As shown in FIG. 27, the bearing member 8 separated from the master shaft 12 forms a closed-end cylindrical shape having a side portion 8b and a bottom portion 8c which are integral with the bearing member 8. In particular, in this embodiment, an upper end of the electroforming portion 10 is also covered with the mold portion 14. Accordingly, the electroforming portion 10 can be prevented from being drawn out therefrom. An inner circumferential surface of such the coating portion of the mold portion 14 is formed as a tapered surface 14a, and a seal space is formed between the tapered surface 14a and the outer circumferential surface of the shaft member 2 after the bearing device is assembled as will be described later.

Into an inner circumference of the shaft member 8 separated from the master shaft 12, as shown in FIG. 27, a shaft member 2 fabricated separately from the master shaft 12 is inserted, and a fluid dynamic bearing device (fluid dynamic bearing device) 1 is thus constructed. The shaft member 2 is formed of a metal material rich in abrasion resistance such as stainless steel, an outer circumferential surface 2a thereof is formed into a perfect circular shape which does not have the dynamic pressure grooves, and a lower end surface 2b thereof is formed into a flat surface shape which does not have the dynamic pressure grooves. An outer diameter dimension of the shaft member 2 is slightly smaller than an inner diameter dimension of regions of the radial bearing surfaces A between the dynamic pressure grooves, which are the protruding portions which define the dynamic pressure grooves. Thus, a radial bearing gap (not shown) approximately in a range of 1 μm to several ten μm is formed between the outer circumferential surface of the shaft member 2 and the two radial bearing surfaces A.

Further, by inserting the shaft member 2 into the inner circumference of the bearing member 8, the tapered seal space S is formed between the tapered surface 14a of an upper end opening portion of the mold portion 14 and the outer circumferential surface 2a of the shaft member 2. After the insertion of the shaft member 2, an inner space of the fluid dynamic bearing device 1 hermetically sealed at the seal space S is filled with, for example, the lubricating oil as the lubricating fluid. In this state, an oil level of the lubricating oil is maintained within the seal space S. The seal space S can be formed into a cylindrical space having the same width overall, as well as is formed into the tapered space in which an upper space is expanded. Further, the tapered surface 14a constructing the seal can also be composed of a separate member from the mold portion 14.

The fluid dynamic bearing device 1 is constructed as described above. When the shaft member 2 and the bearing member 8 rotate relatively to each other (for example, when the shaft member 2 rotates), the dynamic pressure of the lubricating oil is generated in the above-mentioned radial bearing gap, and by the pressure thereof, the shaft member 2 is supported rotatably in the radial direction in a non-contact fashion with the bearing member 8. Thus, a first radial bearing portion R1 and a second radial bearing portion R2, for supporting the bearing member 2 rotatably in the radial direction in a non-contact fashion therewith, are formed.

Further, the thrust bearing surface B of the bearing member 8 is opposite to the lower end surface 2b of the shaft member 2 through a thrust bearing gap. As the shaft member 2 rotates, the dynamic pressure of the lubricating oil is also generated in the thrust bearing gap, and by the pressure thereof, the shaft member 2 is supported in a non-contact fashion with the bearing member 8 rotatably in the thrust direction. Thus, a thrust bearing portion T is formed, for supporting the shaft member 2 in the non-contact fashion rotatably in the thrust direction.

As described above, in the fluid dynamic bearing device 1 of the present invention, both of the radial bearing surfaces A and the thrust bearing surface B are formed on the electroforming portion 10, and the bearing member 8 is formed by the injection molding in which each electroforming portion 10 is inserted. Therefore, the constructions of the radial bearing portions R1 and R2 and the thrust bearing portion T can be simplified, and in addition, the number of parts and the number of man-hours can be reduced, thus making it possible to achieve the cost reduction of the bearing device 1. Further, since the radial bearing surfaces A and the thrust bearing surface B are subjected to the electroforming process, the dynamic pressure grooves with high accuracy can be formed, and high bearing performance can be obtained. In addition, powder that may be generated by cutting is not generated as the bearing surfaces A and B are being molded, and a problem of contamination is also solved.

Further, the master shaft 12 fabricated once can be repeatedly used, and the radial bearing surfaces A and the thrust bearing surface B after being molded are formed into shapes corresponding to the surface shapes of the forming portions N1 and N2 of the master shaft. Hence, the bearing member 8 having little variations in accuracies of the dynamic pressure grooves among each other can be obtained, thus making it possible to stably mass-produce the fluid dynamic bearing device 1 having high rotational accuracy.

Note that an outer surface of the electroforming portion 10 is formed into a rough surface owing to characteristics of the electroforming process. Accordingly, at the time of the insert molding, the resin material constructing the mold portion 14 enters into spaces caused by micro irregularities on the outer surface of the electroforming portion 10, and exerts an anchor effect. Therefore, a strong adhesion force is exerted between the electroforming portion 10 and the mold portion 14, and the electroforming portion 10 and the mold portion 14 are reliably prevented from being rotated with respect to each other and detached from each other. Hence, it becomes possible to provide the strong bearing member 8 rich in impact resistance.

Figure 28:
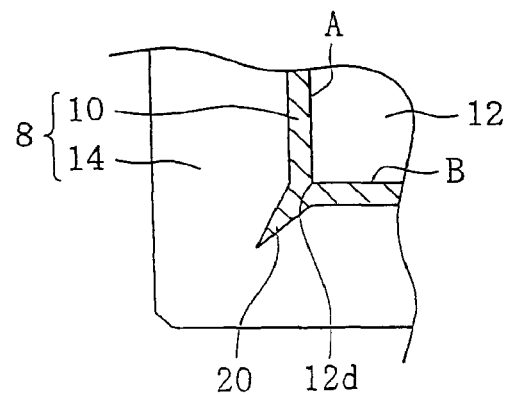
FIG. 28 is a partially enlarged cross-sectional view of the bearing member.

When an effect of preventing such rotation and drawing out is insufficient, as shown in FIG. 28, a flange 20 is formed on the electroforming portion integrally therewith, and is incorporated in the mold portion 14. Then, the effect of preventing the rotation and the drawing out can be further enhanced.

In the shown example, the flange 20 is formed in an inclined manner on a corner portion of the radial bearing surface A and the thrust bearing surface B, and it is possible to form this type of flange 20 in the electroforming process. To be specific, when the master shaft 12 of the shown embodiment is immersed into the electrolytic solution, usually, a deposition amount of metal particles is large in a lower end corner portion 12d of the master shaft 12 as compared with other portions. Accordingly, the inclined flange 20 shown in FIG. 28 grows. Therefore, when the electroforming shaft 11 added with the flanges 20 is formed as it is by the resin material, it becomes possible to use the flange 20 as a portion for preventing the rotation and the drawing out.

Note that the flange 20 can also be formed by plastically deforming the electroforming portion 10. In this case, a forming position of the flange 20 is not particularly limited, and for example, the flange 20 may also be formed by plastically deforming the upper end of the electroforming portion 10 to the outer diameter side.

Figure 29:
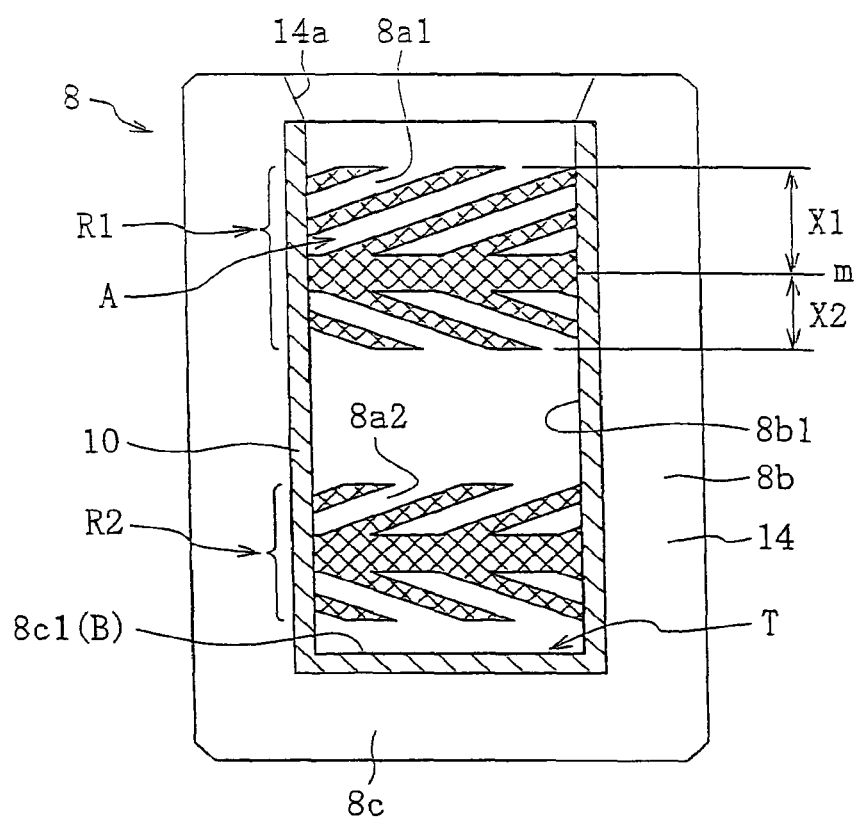
FIG. 29 is a cross-sectional view of the bearing member.

The above description illustrates the case of forming the dynamic pressure grooves symmetrically in the axial direction on the radial bearing portions R1 and R2. However, the dynamic pressure grooves can also be formed asymmetrically in the axial direction. FIG. 29 shows a state where the shaft member 2 is drawn out from the bearing member 8, where an example of the above-mentioned asymmetric forming is shown. In FIG. 29, the dynamic pressure groove 8a1 is formed asymmetrically in the radial direction with respect to an axial center thereof (axial center of the region between the upper and lower inclined grooves) by the upper radial bearing portion R1, and an axial dimension X1 of an upper region of the dynamic pressure groove 8a1 from the axial center m is set larger than an axial dimension X2 of a lower region thereof. On the lower radial bearing portion R2, the dynamic pressure groove 8a2 is formed symmetrically in the axial direction, and axial dimensions of upper and lower regions thereof are individually equal to the above-mentioned axial dimension X2. In this case, the feeding force (pumping force) of the lubricating oil by the dynamic pressure grooves when the shaft member 2 is rotated is relatively larger in the upper dynamic pressure groove 8a1 than in the lower symmetric dynamic pressure groove 8a2. Therefore, a downward flow of the lubricating oil is generated in the radial bearing gap, thus making it possible to supply the lubricating oil abundantly to the thrust bearing portion T.

Further, the above description illustrates the case of forming the radial bearing surfaces A and the thrust bearing surface B on the electroforming portion 10 formed as a single member. However, a construction can also be adopted, in which the electroforming portion 10 is divided into two or more portions, and both of the bearing surfaces A and B are individually formed on electroforming portions thus formed separately.

Next, a description will be made of an example of a motor, in which the fluid dynamic bearing device 1 described above is incorporated, with reference to the drawings.

Figure 26:
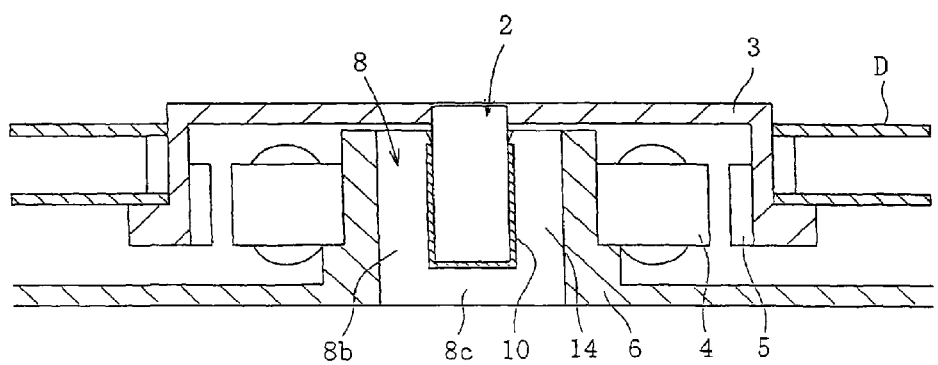
FIG. 26 is a cross-sectional view showing an example of the spindle motor using the fluid dynamic bearing device of the present invention.

FIG. 26 shows a construction example of the spindle motor for the information apparatus. The spindle motor is the one to be used for the disk drive device such as the HDD, and includes the fluid dynamic bearing device 1 which rotatably supports the shaft member 2 in a non-contact fashion, a rotor (disk hub) 3 attached to the shaft member 2, and a stator coil 4 and a rotor magnet 5, both of which are opposed to each other through an intermediation of a radial gap. The stator coil 4 is attached to an outer circumference of a bracket 6, and the rotor magnet 5 is attached to an inner circumference of the disk hub 3. The bearing member 8 of the fluid dynamic bearing device 1 is attached to an inner circumference of the bracket 6. On the disk hub 3, one or a plurality of disks D such as the magnetic disks are held. When the stator coil 4 is energized, the rotor magnet 5 is rotated by electromagnetic force between the stator coil 4 and the rotor magnet 5, and the disk hub 3 and the shaft member 2 are thereby rotated integrally with each other.

The construction of the present invention can be used not only for the above-mentioned fluid dynamic bearing device 1 but also preferably for fluid dynamic bearing devices with a form shown below. A description will be made below of the construction of the fluid dynamic bearing device with reference to the drawings. Common reference symbols will be assigned to members having the same constructions as and common functions to those of the fluid dynamic bearing device 1 shown in FIG. 27, and a repeated description will be omitted.

Figure 30:
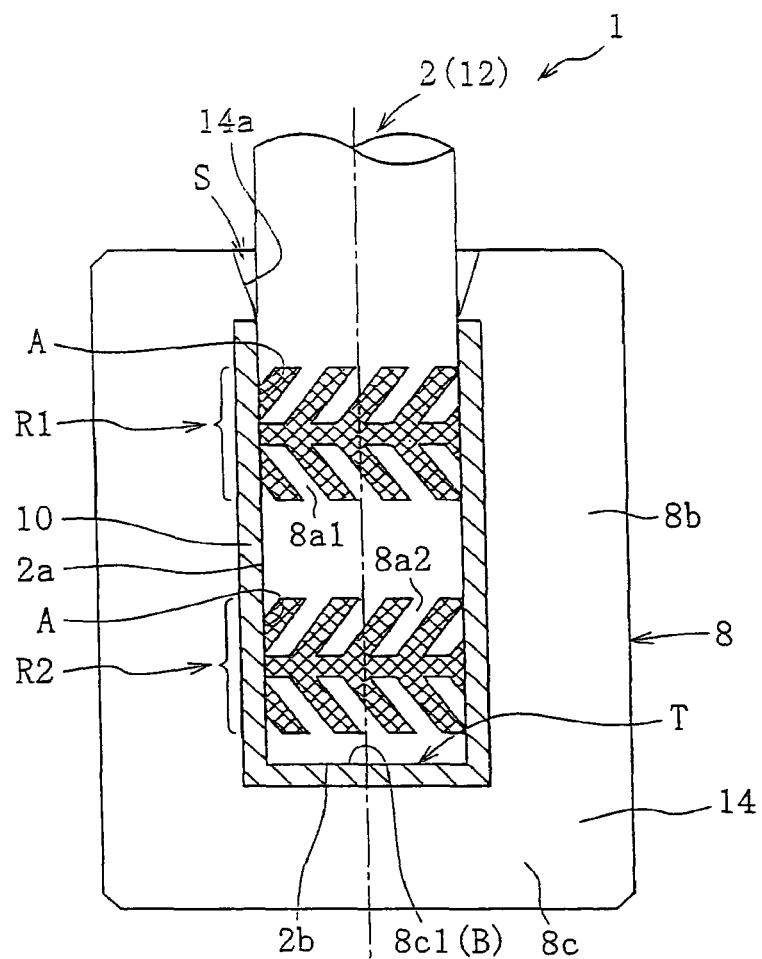
FIG. 30 is a cross-sectional view showing another embodiment of the fluid dynamic bearing device.

FIG. 30 is a view showing another embodiment of the fluid dynamic bearing device 1. In the fluid dynamic bearing device 1, the dynamic pressure grooves 8a1 and 8a1 serving as the dynamic pressure generating portions are formed on the outer circumferential surface 2a of the shaft member 2 and the lower end surface 2b of the shaft member 2 (the dynamic pressure groove formed on the lower end surface 2b is not shown), and the radial bearing surfaces A and the thrust bearing surface B of the bearing member 8 are formed into a perfect circular shape in cross section and a flat surface shape, respectively, both of which do not have the dynamic pressure grooves. In this case, the outer circumferential surface 12a and lower end surface 12c of the master shaft 12 are formed into a perfect circular shape and a flat surface shape in cross section, respectively, both of which do not have the dynamic pressure grooves. The above-mentioned electroforming process and the molding step are performed using the master shaft 12. Further, the master shaft 12 is separated from the shaft bearing member 8 to form the radial bearing surfaces A and the thrust bearing surface B. Then the shaft member 2, which is a member different from the master shaft 12, is inserted into the inner circumference of the bearing member 8. The dynamic pressure grooves are preliminarily formed on the outer circumferential surface 2a and the lower end surface 2b of the shaft member 2 by means of a mechanical process or etching.

Figure 31:
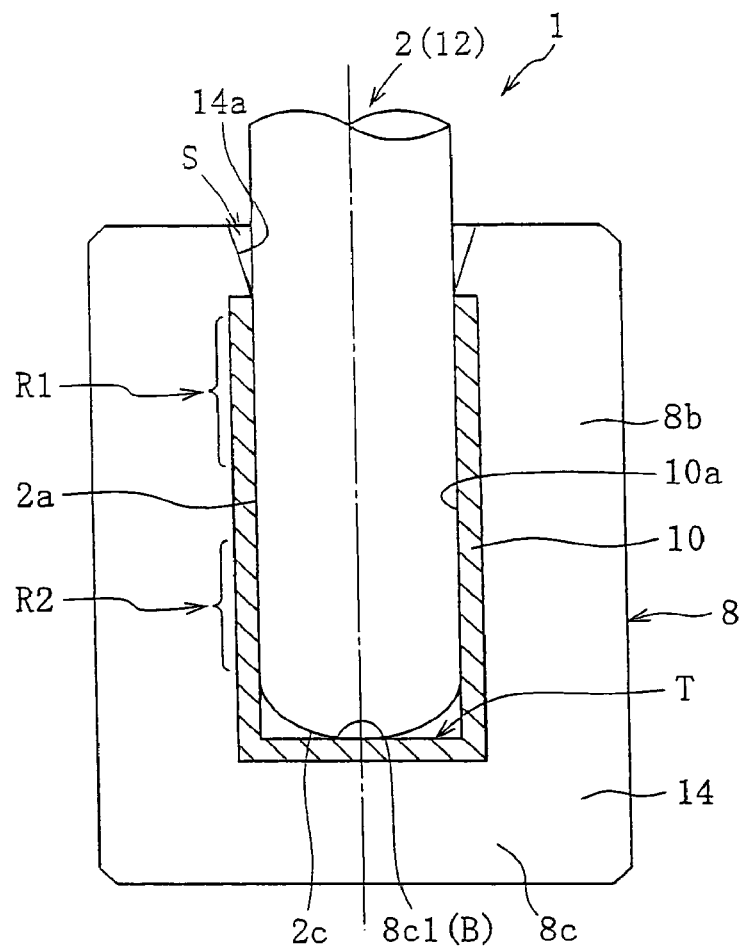
FIG. 31 is a cross-sectional view showing another embodiment of the fluid dynamic bearing device.

FIG. 31 is a view showing still another embodiment of the fluid dynamic bearing device 1. In the fluid dynamic bearing device 1, unlike the embodiments shown in FIGS. 27 and 29, the thrust bearing portion T is composed of a pivot bearing, and each of the radial bearing portions R1 and R2 is composed of a perfect circular bearing which does not have the dynamic pressure generating portion. On the lower end of the shaft member 2, a convex spherical surface 2c is formed, and the spherical surface 2c is supported by the thrust bearing surface portion B with the flat surface shape in a contact fashion therewith, and the thrust bearing portion T composed of the pivot bearing is thus constructed. Further, the outer circumferential surface 2a of the shaft member 2 has the perfect circular shape in cross section, which does not have the dynamic pressure grooves, and the perfect circular bearings are composed of the outer circumferential surface 2a and the radial bearing surfaces A with the perfect circular shape in cross section. In this case, any one of the radial bearing portions R1 and R2 and the thrust bearing portion T can also be replaced by the dynamic bearing shown in FIG. 27 or 29.

Figure 32:
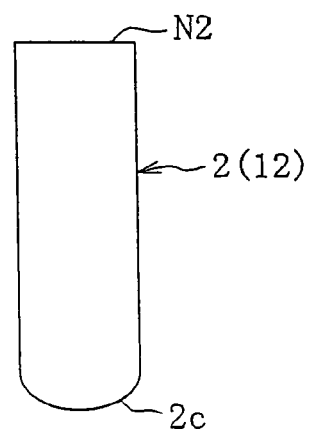
FIG. 32 is a front view of a master shaft to be used as a shaft member.

In the case of the embodiment shown in FIG. 31, as the shaft member 2, the master shaft 12 itself can also be used, as well as a member separate from the master shaft 12 as in the embodiments shown in FIGS. 27 and 29. In this case, as shown in FIG. 32, the thrust bearing surface forming portion N2 with the flat surface shape, which forms the thrust bearing surface B, is formed on one end (upper end in FIG. 32) of the master shaft 12, and the bearing constructing portion 2c with the convex spherical shape, which constructs the thrust bearing portion T, is formed on the other end of the master shaft 12. In the electroforming process, the electroforming portion 10 is formed on the thrust bearing surface forming portion N2 of the master shaft 12 shown in FIG. 32, and meanwhile, the masking is applied to the bearing constructing portion 2c, thereby forming the electroforming shaft 11. Next, the electroforming shaft 11 is subjected to the insert molding, and the bearing shaft member 8 and the master shaft 12 are separated from each other. After that, the master shaft 12 is reversed, and the spherical surface 2c serving as the bearing constructing portion is inserted into the inner circumference of the bearing member 8, and then the spherical surface 2c is brought into contact with the thrust bearing surface B. Thus, the thrust bearing portion T composed of the pivot bearing is constructed. Thus, it becomes possible to concurrently use the master shaft 12 as a jig for molding the electroforming portion 10 and a constituent element of the bearing device 1.

This method is also applied to the embodiments shown in FIG. 27 and FIG. 29, thus making it possible to directly use the master shaft 12 as the shaft member 2. In this case, the flat surface is formed on one end surface of the master shaft 12, and the dynamic pressure grooves (or a molding mold of the dynamic pressure grooves) is formed on the other end surface. One of both end surfaces of the master shaft 12 becomes the forming portion of the thrust bearing surface B, and the other becomes a bearing constructing portion for constructing the thrust bearing portion T.

The embodiments shown in FIGS. 27 and 29 illustrate the constructions of the radial bearing portions R1 and R2 for generating a fluid dynamic pressure by the herringbone-shaped and spiral-shaped dynamic pressure grooves. However, the present invention is not limited to this, and for example, the multi-lobe bearing and the step bearing, which are shown in FIGS. 17 to 20, may also be employed as the radial bearing portions R1 and R2.

Further, the construction described above can also be applied to the case where the perfect circular bearing which does not have the dynamic pressure generating portion is employed as the radial bearing portions R1 and R2.

Figure 33:
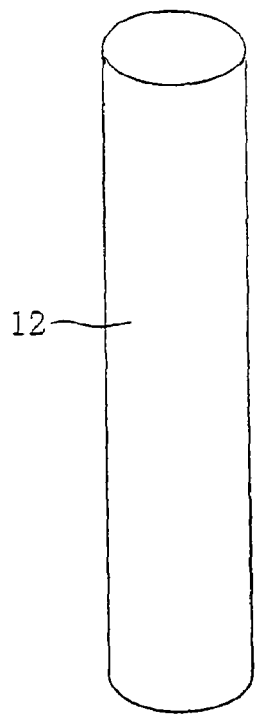
FIG. 33 is a perspective view of the mater shaft.
Figure 34:
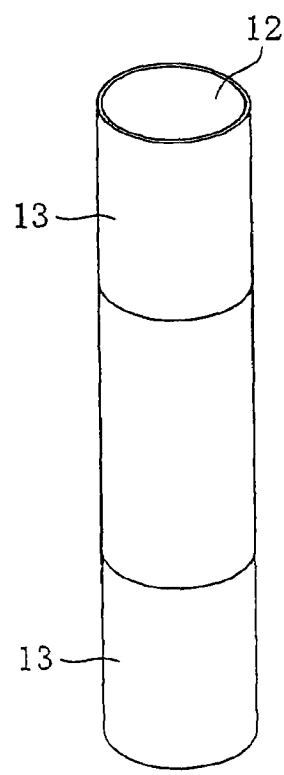
FIG. 34 is a perspective view showing the master shaft which is subjected to the masking.
Figure 35:
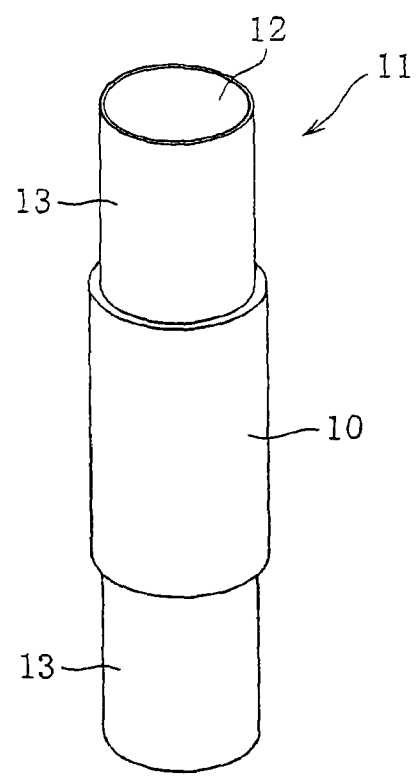
FIG. 35 is a perspective view of an electroforming shaft.

As shown in FIG. 33, fabrication steps of the perfect circular bearing are basically common to the steps shown in FIGS. 2A to 2C except that the outer circumferential surface of the master shaft 12 is of a cylindrical surface shape which does not have the forming portion N. To be specific, the perfect circular bearing is fabricated through a step of coating regions of the master shaft 12, which require the masking, with a masking material 13 (refer to FIG. 34), a step of forming the electroforming shaft 11 by performing the electroforming process for an unmasked portion (refer to FIG. 35), and a step of forming the bearing member 8 by molding the electroforming portion 10 of the electroforming shaft 11 by a resin and the like (refer to FIG. 5), and a step of separating the electroforming portion 10 and the master shaft 12 from each other.

Figure 36:
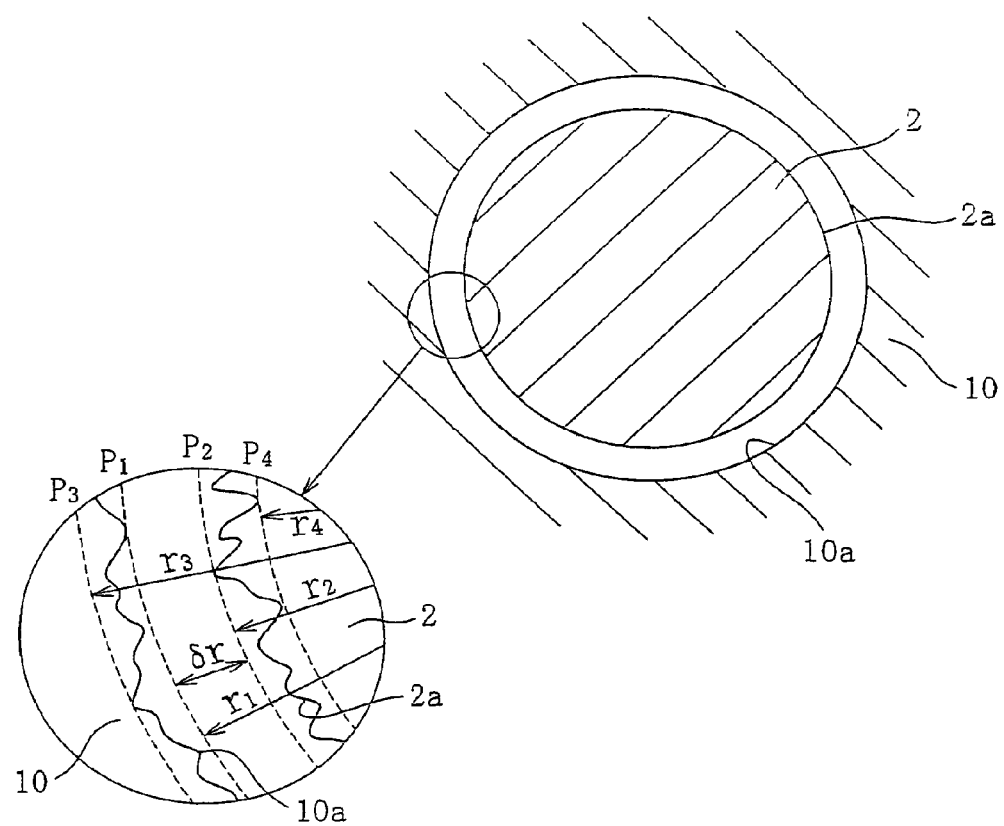
FIG. 36 is a cross-sectional view of the bearing device in a radius direction, and an enlarged view of the bearing device.

When the radial bearing portions R1 and R2 are composed of the perfect circular bearings, a size of the minimum clearance between the inner circumferential surface 10a (bearing surface) of the electroforming portion 10 and the outer circumferential surface 2a of the shaft member 2 largely affects the bearing performance. As shown in FIG. 36, the minimum clearance δr is represented by a difference r1−r2 between a radius r1 of a virtual circle P1 inscribed to the bearing surface 10a of the electroforming portion 10 and a radius r2 of a virtual circle P2 circumscribed to the outer circumferential surface 2a of the shaft member 2. It is desirable that the minimum clearance δr be set as: δr≥0 in a state where the shaft member 2 is inserted into the inner circumference of the bearing member 8 as shown in FIG. 36.

As described above, by ensuring the positive minimum clearance δr, an occurrence of an unpreferable contact state between the shaft member 2 and the bearing member 8 can be avoided when both thereof are rotated relatively to each other, and a stable rotation supporting state can be maintained. The size of the minimum clearance δr mainly depends on the diameter expansion amount of the electroforming portion 10 in the separation step. Accordingly, the thickness and electroforming conditions of the electroforming portion 10 are set so as to obtain such the numeric value as described above for the minimum clearance δr.

In this case, the sum of circularity (radius difference |r1−r3| between the inscribed and circumscribed circles P1 and P3 of the bearing surface 10a in FIG. 36) of the bearing surface 10a of the electroforming portion 10 and circularity (radius difference |r2−r4| between the inscribed and circumscribed circles P2 and P4 of the outer circumferential surface 2a in FIG. 36) of the outer circumferential surface 2a of the shaft member 2 is set to 4 μm or less.

As described above, the sum of the circularity of the bearing surface 10a and the circularity of the outer circumferential surface 2a of the shaft member 2, which is opposite thereto, is restricted to be 4 μm or less, and thus the bearing gap between both of the surfaces 10a and 2a becomes more even with smaller variations over the circumferential direction. Hence, a more stable rotation supporting state can be obtained, and in addition, both of the surfaces 10a and 2a can be formed into relatively smooth surfaces, thus making it possible to restrict the abrasion thereof as much as possible when the shaft member 2 and the bearing member 8 rotates relatively to each other. The outer circumferential surface of the master shaft 12 is subjected to a finishing process so as to satisfy the above-mentioned numerical conditions (δr≥0, |r1−r3|+|r2−r4|≤4 μm).

As an example, a master shaft with a shaft diameter Ø of 1.5 mm and a circularity of 0.5 μm was fabricated of stainless steel (SUS420F), and the electroforming process was performed therefor for two hours by a sulfamic acid nickel bath, thereby forming the electroforming portion 10 with a thickness of 0.1 mm. Then, it has been found that a bearing device which satisfies the above-mentioned numerical conditions can be obtained.

Note that, also when the radial bearing portions R1 and R2 are composed of the dynamic bearings as shown in FIGS. 8, 9, and the like, it is desirable that the above-mentioned numerical conditions be satisfied. In this case, the minimum clearance δr is represented by a difference between a radius of a virtual circle inscribed to the protruding portions which define and form the dynamic pressure grooves and a radius of a virtual circle circumscribed to the outer circumferential surface 2a of the shaft member 2. Further, the circularity of the bearing surface 10a is evaluated by an inner circumferential surface of the protruding portions.

The perfect circular bearing can be used not only as a bearing device for rotation but also as a bearing device for sliding, a bearing device for rotation/sliding, and further, a bearing device for swinging, and it is possible to apply the construction of the present invention to all of those varieties of bearing devices. The "bearing device for rotation" means a device for supporting the relative rotation between the shaft 2 and the bearing member 8, and the "bearing device for sliding" means a device for supporting a relative linear motion between the shaft 2 and the bearing member 8. The "bearing for rotation/sliding" means a device which concurrently has functions of the above-mentioned two bearing devices, for supporting both of the rotational motion and the linear motion between the shaft 2 and the bearing member 8. The "bearing for swinging" means a bearing for supporting a swinging motion between the shaft 2 and the bearing member 8. In either cases, no problem occurs whichever the bearing member 8 may be situated on the movable side or the fixed side. Further, the bearing device can also be used by supplying the lubricant such as oil to the bearing gap, as well as is used by supplying no oil thereto.

In the bearing device for rotation, a lateral cross section of the master shaft 12 is basically formed into a circular shape. However, in the case of the bearing device for sliding, a lateral cross section of the master shaft 12 can be formed into an arbitrary shape such as a polygonal shape and a non-perfect circular shape as well as the circular shape. Further, in the bearing device for sliding, the lateral cross-sectional shape of the master shaft 12 is basically constant in the axial direction. However, in the bearing device for rotation and the bearing device for rotation/sliding, a form is sometimes adopted, in which the lateral cross-sectional shape is not constant over the overall axis of the shaft.

In the fluid dynamic bearing device 1, the separate member fabricated separately from the master shaft 12 and with accuracy approximate to that of the master shaft 12 is basically used as the shaft member 2. However, in the perfect circular bearing, in addition to the above, the master shaft 7 can be directly used as the shaft member 2. In this case, the surface accuracy of the bearing surfaces 4 correspond to the accuracy of the outer circumferential surface of the master shaft 7. Accordingly, a merit can be obtained that a matching work to be performed after that becomes unnecessary.

In the above description, the lubricating oil has been shown as the lubricating fluid filled in the inside of the fluid dynamic bearing device. However, in addition to the above, fluid capable of generating the dynamic pressure in each of the bearing gaps, for example, gas such as air can also be used as well as magnetic fluid.

The invention claimed is:

1. A method of manufacturing a bearing member including a mold portion and an electroforming portion having a dynamic pressure generating portion on an inner circumferential surface thereof and disposed on an inner circumferential surface of the mold portion, comprising the steps of:
   fabricating a master shaft having a forming portion corresponding to a shape of the dynamic pressure generating portion on an outer circumference of the master shaft, the forming portion having an irregular shape in an axial direction;
   forming the electroforming portion by depositing a metal on the outer circumference of the forming portion of the master shaft by immersing the forming portion corresponding to the shape of the dynamic pressure generating portion of the master shaft into an electrolytic solution containing metal ions;
   inserting the electroforming portion with the master shaft into a mold after the electroforming portion is formed;
   forming the mold portion of the bearing member by infection molding material around the electroforming portion; and
   separating the master shaft and the electroforming portion from each other after the injection molding, such that a gap is formed between the forming portion of the master shaft and the dynamic pressure generating portion of the electroforming portion, the gap being formed by a diameter expansion of the inner circumferential surface of the electroforming portion, and the gap having a size that can cancel axial engagement of irregularities between the dynamic pressure generating portion and the forming portion when drawing the master shaft out from the electroforming portion.

2. The method of manufacturing the bearing member according to claim 1,
   wherein the dynamic pressure generating portion includes a plurality of dynamic pressure grooves.

3. The method of manufacturing the bearing member according to claim 1,
   wherein the dynamic pressure generating portion includes a plurality of circular arc surfaces.

4. The method of manufacturing the bearing member according to claim 1,
   wherein the electroforming portion includes a flange formed through plastic deformation of the electroforming portion.

5. The method of manufacturing the bearing member according to claim 4,
   wherein in top or bottom plan view, an outer circumferential surface of the flange is formed in non-circular shape without adding another step after the plastic deformation.

6. The method of manufacturing the bearing member according to claim 4,
   wherein, when the injection molding is performed while inserting the electroforming portion, the electroforming portion is plastically deformed by clamping a metal mold to form a flange on the electroforming portion.

7. The method of manufacturing the bearing member according to claim 4,
   wherein the electroforming portion has an axial length L2 before the plastic deformation of the flange and an axial length L1 after the plastic deformation of the flange, which satisfy a following relationship expressed as $0 < A/L1 < 0.5$ (where $A = L2 - L1$).

8. The method of manufacturing the bearing member according to claim 1. wherein:
   the bearing member is formed of a resin used as an injection molding material; and
   a mold shrinkage factor of the resin is set within a range of 0.02% to 2.0% inclusive.

9. The method of manufacturing the bearing member according to claim 1, wherein
   the bearing member is formed of metal used as an injection molding material.

10. The method of manufacturing the bearing member according to claim 1,
    wherein the master shaft and the electroforming portion are separated from each other by giving the master shaft and the electroforming portion a difference in thermal expansion amount.

* * * * *